US012745078B2

(12) United States Patent
Kunz et al.

(10) Patent No.: US 12,745,078 B2
(45) Date of Patent: Sep. 22, 2026

(54) USER EQUIPMENT AUTHENTICATION FOR APPLICATIONS

(71) Applicant: Lenovo (Singapore) Pte. Limited, Singapore (SG)

(72) Inventors: Andreas Kunz, Ladenburg (DE); Sheeba Backia Mary Baskaran, Friedrichsdorf (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 251 days.

(21) Appl. No.: 18/726,903

(22) PCT Filed: Dec. 29, 2022

(86) PCT No.: PCT/IB2022/062898

§ 371 (c)(1),
(2) Date: Jul. 5, 2024

(87) PCT Pub. No.: WO2023/131860

PCT Pub. Date: Jul. 13, 2023

(65) Prior Publication Data

US 2025/0175791 A1 May 29, 2025

Related U.S. Application Data

(60) Provisional application No. 63/297,453, filed on Jan. 7, 2022.

(51) Int. Cl.
*H04W 12/06* (2021.01)
*H04W 12/0431* (2021.01)

(52) U.S. Cl.
CPC ....... *H04W 12/06* (2013.01); *H04W 12/0431* (2021.01)

(58) Field of Classification Search
None
See application file for complete search history.

(56) References Cited

U.S. PATENT DOCUMENTS

2015/0143125 A1* 5/2015 Nix ....................... H04L 9/0861 713/171
2019/0215691 A1* 7/2019 Salkintzis ........... H04W 12/069

FOREIGN PATENT DOCUMENTS

EP 3883279 A1 9/2021
EP 4089977 A1 11/2022
(Continued)

OTHER PUBLICATIONS

3GPP , "Study on authentication and key management for applications based on 3GPP credential in 5G", 3GPP TR 33.835 V1.2.0, Technical Specification Group Services and System Aspects, Release 16 [retrieved Apr. 12, 2023]. Retrieved from the Internet <https://portal.3gpp.org/desktopmodules/Specifications/SpecificationDetails.aspx?specificationId=3483>, Nov. 2019, 80 pages.
(Continued)

*Primary Examiner* — Frantz Bataille
(74) *Attorney, Agent, or Firm* — FIG. 1 Patents

(57) ABSTRACT

Various aspects of the present disclosure relate to authenticating user equipment (UE) for applications. A first communication device (e.g., a network entity, a server device) authenticates a second communication device (e.g., a UE) for authentication and key management for applications (AKMA) with a challenge, such as an authentication vector (AV), computed based on the AKMA anchor key ($K_{AKMA}$) corresponding to the second communication device. Comparison of the challenge result (RES) received from the second communication device and an expected challenge result (XRES) is performed by an AKMA anchor function (AAnF) or by an application function (AF), and the AKMA application key ($K_{AF}$) for the AF is only provisioned after
(Continued)

the comparison indicates a successful communication device authentication (e.g., the RES and the XRES are the same).

20 Claims, 12 Drawing Sheets

(56) References Cited

FOREIGN PATENT DOCUMENTS

| | | | |
|---|---|---|---|
| WO | 2021155758 | A1 | 8/2021 |
| WO | 2021201558 | A1 | 10/2021 |

OTHER PUBLICATIONS

PCT/IB2022/062898 , "International Preliminary Report on Patentability", International Application No. PCT/IB2022/062898, Jul. 18, 2024, 8 pages.

PCT/IB2022/062898 , "International Search Report and Written Opinion", PCT Application No. PCT/IB2022/062898, Apr. 5, 2023, 12 pages.

* cited by examiner

USER EQUIPMENT AUTHENTICATION FOR APPLICATIONS

RELATED APPLICATION

This application claims priority to U.S. patent application Ser. No. 63/297,453 filed Jan. 7, 2022 entitled "User Equipment Authentication For Applications," the disclosure of which is incorporated by reference herein in its entirety.

TECHNICAL FIELD

The present disclosure relates to wireless communications, and more specifically to authenticating user equipment (UE) for applications.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as UE, or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G.

In some cases, a wireless communications system may be a non-terrestrial network (NTN), which may support various communication devices for wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances. Authentication and key management for applications (AKMA) allows a secure application session to be established between a UE and an application running on one or more other devices via a function of the application referred to as an application function (AF). The UE is authenticated with a home network and an AKMA anchor key ($K_{AKMA}$) corresponding to the UE is created based on the authentication with the home network. If the UE then sends an application session establishment request to the AF, the AF requests an AKMA application key ($K_{AF}$) specific to the AF and the UE. The $K_{AF}$ is derived based on the $K_{AKMA}$ and the AF identity.

SUMMARY

The present disclosure relates to methods, apparatuses, and systems that enable a first communication device (e.g., a network entity, a server device) to authenticate a second communication device (e.g., a UE) for AKMA with a challenge, such as an authentication vector (AV), computed based on the $K_{AKMA}$ corresponding to the second communication device. Comparison of a challenge result (RES) received from the second communication device and an expected challenge result (XRES) is performed by an AKMA anchor function (AAnF) or by an AF, and the $K_{AF}$ for the AF is only provisioned after the comparison indicates a successful communication device authentication (e.g., the RES and the XRES are the same). By authenticating the client (the second communication device) for AKMA with a challenge computed based on the $K_{AKMA}$, the AF is assured that the second communication device is the device that the second communication device claims to be.

Some implementations of the method and apparatuses described herein may further include wireless communication at a device, which includes receiving, from an AF, a request message including a key identifier corresponding to a UE and an AF identity (AF_ID); generating an AV; transmitting, to the AF, a first response message including the generated AV; receiving, from the AF, an authentication response including a RES from the UE; deriving, in response to the RES matching the XRES, a $K_{AF}$ from a $K_{AKMA}$ corresponding to the UE; and transmitting, to the application function, a second response message including the $K_{AF}$ in response to the RES matching the XRES or a failure indication in response to the RES not matching the XRES.

In some implementations of the method and apparatuses described herein, a hash of the XRES (HXRES*) is generated and included in the first response message. Additionally or alternatively, the XRES is generated using the $K_{AKMA}$ corresponding to the UE, the AV, and a key derivation function (KDF). Additionally or alternatively, an authentication result is generated and included in the second response message. Additionally or alternatively, the authentication result indicates success or failure. Additionally or alternatively, authentication being required is determined and the AV is generated in response to determining that authentication is required. Additionally or alternatively, authentication being required is determined based on the key identifier corresponding to the UE, on the AF_ID or a combination thereof. Additionally or alternatively, the AV comprises a random number. Additionally or alternatively, the second response message further includes a $K_{AF}$ expiration time.

Some implementations of the method and apparatuses described herein may further include wireless communication at a device, which includes generating a first request message including a key identifier corresponding to a UE and an AF_ID; transmitting, to an AAnF, the first request message; receiving, from the AAnF, a first response message including an AV; generating a second request message including the AV; transmitting, to the UE, the second request message; receiving, from the UE, a second response message including a RES; transmitting, to the AAnF, a third request message for a $K_{AF}$; and receiving, from the AAnF, a third response message including the $K_{AF}$ or a failure indication.

In some implementations of the method and apparatuses described herein, an application session establishment request including the key identifier corresponding to the UE is received, wherein the third response message further includes an authentication result, and the application session establishment response including the authentication result is transmitted to the UE. Additionally or alternatively, the authentication result indicates success or failure. Additionally or alternatively, the third request message includes the RES and the third response message includes the $K_{AF}$ only if the AAnF determines that the RES matches an XRES. Additionally or alternatively, the second request message further includes a HXRES*, a hash of the challenge result (HRES) received in the second response message is generated, whether the HXRES* matches the HRES is determined, and an indication of failure of the challenge result is included in the third request message if the HXRES* does not match the HRES. Additionally or alternatively, the first response message further includes an XRES, whether the RES received in the second response message matches the XRES is determined, and an authentication result is included in the third request message indicating whether the RES matches the XRES. Additionally or alternatively, the third response message includes the $K_{AF}$ and a $K_{AF}$ expiration time in response to the authentication result indicating that the RES received in the second response message matches the XRES. Additionally or alternatively, receiving the first response message includes receiving the first response message in response to the AAnF determining that authentication is required based on the key identifier corresponding to the UE, on the AF_ID or a combination thereof.

Some implementations of the method and apparatuses described herein may further include wireless communication at a device, which includes generating a first request message to establish an application session with an AF on another apparatus, the first request message including a key identifier corresponding to a UE, the key identifier identifying a $K_{AKMA}$ corresponding to the UE and having been previously generated based on communication with an authentication server function (AUSF); transmitting, to the AF, the first request message; receiving, from the AF, a second request message including an AV; generating a RES based on the $K_{AKMA}$ and the AV and generate a first response message including the RES; transmitting, to the application function, the first response message; and receiving, from the application function message, a second response including an authorization result indicating failure or success of the first request message.

In some implementations of the method and apparatuses described herein, the AV comprises a random number. Additionally or alternatively, generating the RES includes generating the RES using the $K_{AKMA}$ corresponding to the UE, the AV, and a KDF.

Some implementations of the method and apparatuses described herein may further include wireless communication at a device, which includes receiving an application session establishment request including a key identifier corresponding to a UE; generating a first request message including the key identifier corresponding to the UE and an AF_ID; transmitting, to an AAnF, the first request message; receiving, from the AAnF, a first response message including a $K_{AF}$; generating an AV, an XRES, and a second request message including the AV; transmitting, to the UE, the second request message; receiving, from the UE, a second response message including a RES; determining an authentication result based on whether the RES received in the second response message matches the XRES and generate an application session establishment response including the authentication result; and transmitting, to the UE, the application session establishment response In some implementations of the method and apparatuses described herein, the authentication result indicates success or failure. Additionally or alternatively, authentication being required is determined based on the key identifier corresponding to the UE. Additionally or alternatively, authentication being required is determined based on the AF_ID.

BRIEF DESCRIPTION OF THE DRAWINGS

Various aspects of the present disclosure for UE authentication for applications are described with reference to the following Figures. The same numbers may be used throughout to reference like features and components shown in the Figures.

DETAILED DESCRIPTION

Figure 1:
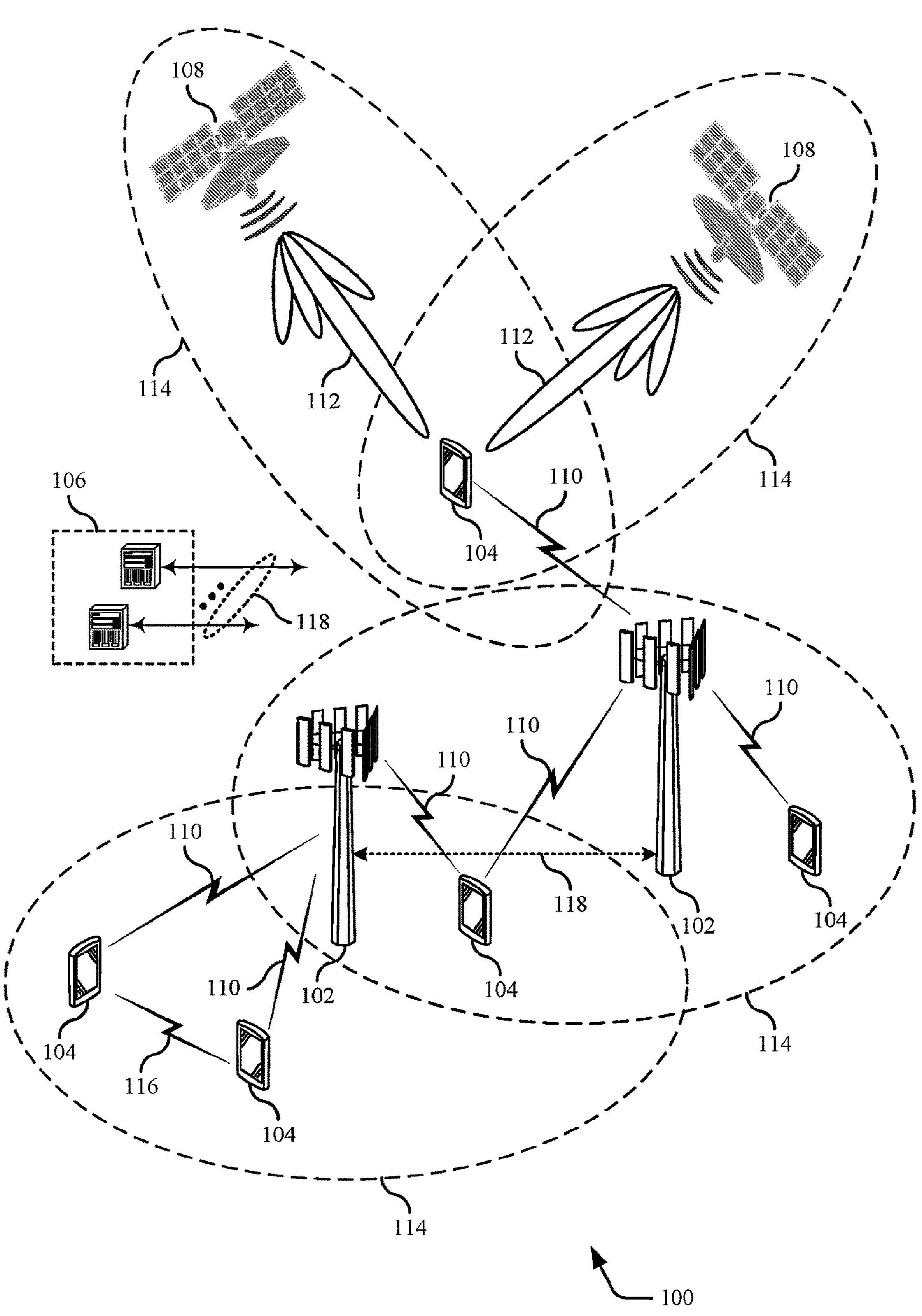
FIG. 1 illustrates an example of a wireless communications system that supports UE authentication for applications in accordance with aspects of the present disclosure

Implementations of UE authentication for applications are described, such as related to enabling a first communication device (e.g., a network entity, a server device) to authenticate a second communication device (e.g., a UE) for AKMA with a challenge, such as an AV, the challenge result RES is computed based on the security key $K_{AKMA}$ corresponding to the second communication device. Comparison of the result RES received from the second communication device and an expected result XRES is performed by an AAnF or by an AF, and the security key $K_{AF}$ for the AF is only provisioned after the comparison indicates a successful communication device authentication (e.g., the RES and the XRES are the same).

Aspects of the disclosure include using a $K_{AKMA}$ corresponding to a UE that has been established based on authentication of the UE to the AAnF, so both the UE and the AAnF are aware of the $K_{AKMA}$ corresponding to the UE. The UE transmits an application session establishment request including an AKMA key identifier (A-KID) to the AF, in response to which the AF transmits a request message that includes an AF_ID and the A-KID to the AAnF. The AAnF generates an AV and an XRES and returns the AV (and optionally the XRES) to the AF. The AV includes any of various data, such as a random or pseudorandom number. The AF transmits a client authentication request including the AV to the UE, in response to which the UE generates a RES based on the $K_{AKMA}$ and the AV. The UE transmits the RES to the AF and a determination is made (by the AF or the AAnF) whether the RES matches (e.g., is the same as) the XRES. If the RES matches the XRES, the AAnF derives a $K_{AF}$ for the AF from the $K_{AKMA}$ and transmits the $K_{AF}$ to the AF. The AF then responds to the application session establishment request indicating that the application session has been established. The $K_{AF}$ is then used during the application session, such as to ensure the application session between the UE and the AF is secure (e.g., encrypt communications between the UE and AF), to assure the AF that the UE is the device the UE claims to be, and so forth.

Aspects of the disclosure include using a $K_{AKMA}$ corresponding to a UE that has been established based on authentication of the UE to the AAnF, so both the UE and the AAnF are aware of the $K_{AKMA}$ corresponding to the UE. The UE transmits an application session establishment request including an A-KID to the AF, in response to which the AF transmits a request message that includes an AF_ID and the A-KID to the AAnF. The AAnF derives a $K_{AF}$ for the AF from the $K_{AKMA}$ and transmits the $K_{AF}$ to the AF. The AF generates an XRES and an AV, which includes any of various data, such as a random or pseudorandom number. The AF transmits a client authentication request including the AV to the UE, in response to which the UE generates a RES based on the $K_{AKMA}$ and the AV. The UE transmits the RES to the AF and the AF determines whether the RES matches (e.g., is the same as) the XRES. If the RES matches the XRES, the AF responds to the application session establishment request indicating that the application session has been established. The $K_{AF}$ is then used during the application session, such as to ensure the application session between the UE and the AF is secure (e.g., encrypt communications between the UE and AF), to assure the AF that the UE is the device the UE claims to be, and so forth.

The techniques discussed herein provide client (UE) authentication for AKMA with a challenge (the AV) computed based on the AKMA root key $K_{AKMA}$. Comparison of the RES and the XRES is performed in the AAnF (or the AF), and in some implementations the key for the AF is only provisioned from the AAnF after successful client authentication.

Conventional solutions for establishing the $K_{AF}$ include having the UE provide an A-KID to the AF and the AF has the AAnF derive the $K_{AF}$ from the $K_{AKMA}$ corresponding to the A-KID. However, such solutions provide no assurance that the UE providing the A-KID is actually the UE identified by the A-KID. By authenticating the client for AKMA with a challenge computed based on the $K_{AKMA}$, the techniques discussed herein allow the AF to be assured that the UE is the device that the UE claims to be.

Furthermore, other solutions may mandate that a key be derived from the root key of the universal subscriber identity module (USIM). Such solutions are not backward compatible with the existing AKMA procedures in which $K_{AKMA}$ is derived from an AUSF key. The techniques discussed herein allow the AF to be assured that the UE is the device that the UE claims to be in a manner that is backward compatible with existing AKMA procedures, allowing the techniques discussed herein to be integrated into the existing AKMA procedures without breaking the backward compatibility.

Aspects of the present disclosure are described in the context of a wireless communications system. Aspects of the present disclosure are further illustrated and described with reference to device diagrams and flowcharts that relate to UE authentication for applications.

FIG. 1 illustrates an example of a wireless communications system 100 that supports UE authentication for applications in accordance with aspects of the present disclosure. The wireless communications system 100 may include one or more base stations 102, one or more UEs 104, a core network 106, and one or more non-terrestrial stations (NTSs) 108, such as satellite access nodes. The wireless communications system 100 may support various radio access technologies (RATs). In some implementations, the wireless communications system 100 may be a 4G network, such as an LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support RATs beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be, or include, or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geosynchronous (GEO) satellites), MEO satellites, LEO satellites, HAPS, UAV, aircraft, or any other vehicle travelling in the earth's atmosphere, orbiting in outer space, and the like. Any entity referred to as a non-terrestrial station (NTS) in the present disclosure may be referring to a satellite, a satellite access node, NTN node, NG-RAN node, NT-TRP, NTN TP, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or the NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IOT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the location management function (LMF), or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation, one or more of the UEs 104, the base stations 102, and/or one or more of the NTSs 108 are operable to implement various aspects of UE authentication for applications, as described herein. For instance, leveraging the described techniques, a UE 104 is operable to use the communications system 100 to communicate with an AF and assuring the AF that the UE is the device the UE claims to be.

Figure 2:
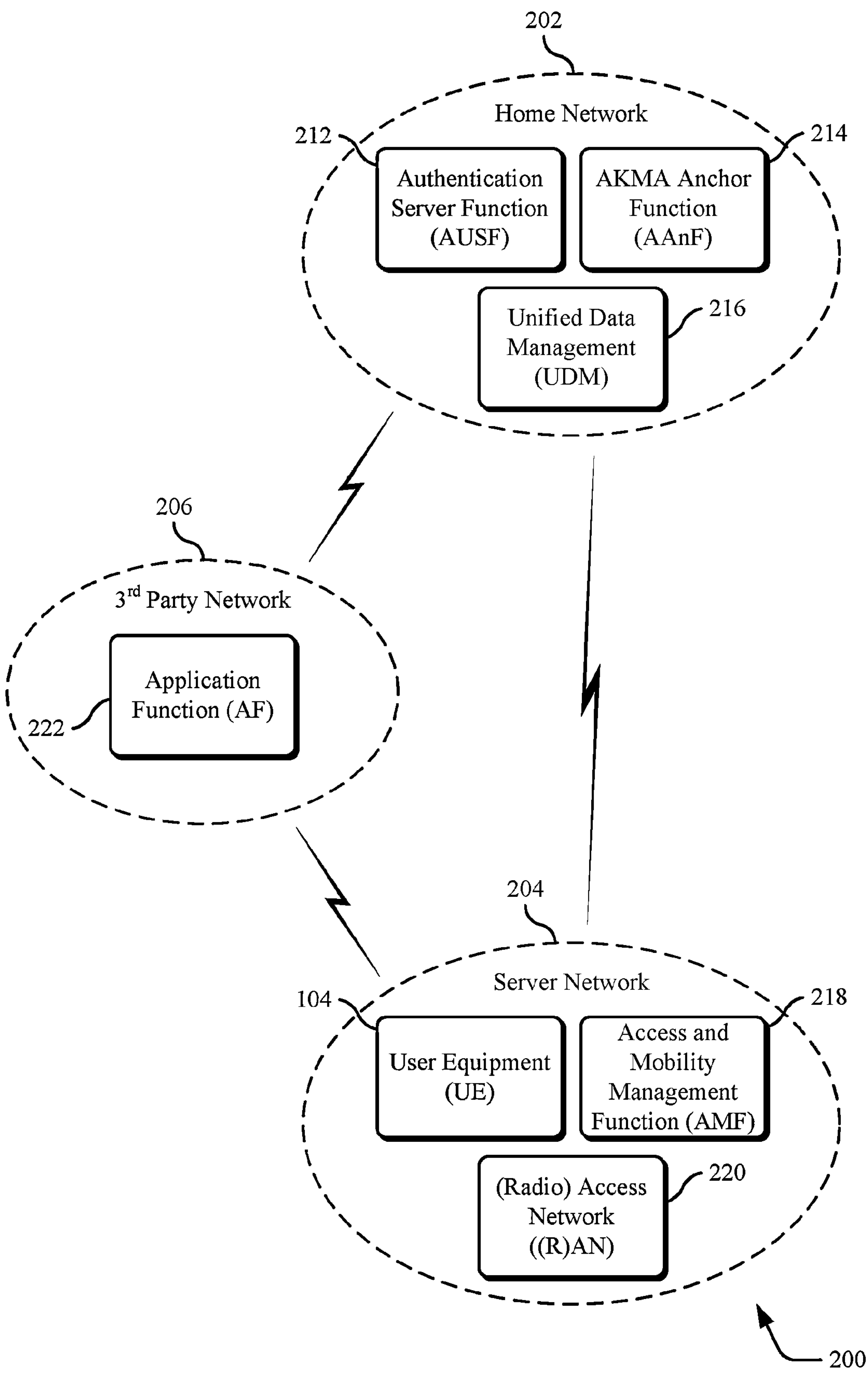
FIG. 2 illustrates an example of a system that may use the wireless communication system in accordance with aspects of the present disclosure

FIG. 2 illustrates an example of a system 200 that supports UE authentication for applications in accordance with aspects of the present disclosure. The system 200 may use the wireless communication system 100 in accordance with aspects of the present disclosure. The system 200 includes a home network 202, a server network 204, and a 3$^{rd}$ party network 206. The home network 202 includes one or more devices providing various functionality to authenticate the UEs 104 and generate cryptographic keys. The server network 204 includes one or more UEs 104 as well as one or more devices providing various functionality to support communication by the UEs 104 with other UEs 104 or other devices. The 3$^{rd}$ party network 206 includes one or more devices that provide functionality that is accessible to the UEs 104, such as websites, games, audio/video content playback, and so forth. In one or more implementations, the home network 202 and the server network 204 are part of the core network 106 of FIG. 1. In one or more implementations, the UE 104 accesses devices in the 3$^{rd}$ party network using the communication system 100 and via the Internet.

In one or more implementations, the home network 202 includes one or more devices implementing an AUSF 212, an AAnF 214, and a unified data management (UDM) 216 (or UDM module). The AUSF 212 supports authentication for 3$^{rd}$ Generation Partnership Project (3GPP) access and untrusted non-3GPP access. The AUSF 212 performs the AAnF selection and provides the subscription permanent identifier (SUPI) and AKMA key material (A-KID, $K_{AKMA}$) of the UE to the AAnF.

The AAnF 214 stores the ($K_{AKMA}$) for AKMA service, which is received from the AUSF after the UE completes a successful 5G primary authentication. The AAnF also generates the $K_{AF}$ to be used between the UE and the AF and maintains UE AKMA contexts.

The UDM 216 provides various functionality including generation of 3GPP authentication and key agreement (AKA) authentication credentials and user identification handling (e.g., storage and management of SUPI for each subscriber in the 5G system). The UDM 216 also stores AKMA subscription data of the subscriber.

In one or more implementations, the server network 204 includes one or more devices implementing the UE 104, an AMF 218, and a (Radio) Access Network (R)AN 220. The AMF 218 receives connection and session related information from the UE and handles connection and mobility management tasks for the UE. The AMF 218 provides various functionality including registration management, connection management, mobility management, access authentication, access authorization, and so forth. The (R)AN 220 manages transmitting and receiving RAN traffic.

In one or more implementations, the 3$^{rd}$ party network 206 includes one or more devices implementing the AF 222. Although a single AF 222 is illustrated the 3$^{rd}$ party network 206 can include multiple AFs 222. The AF 222 interacts with the UE 104 to provide various services. The AF 222 is, for example, a function of an application that the UE 104 or a user of the UE 104 desires to use or interact with. Examples of such applications include games, audio/video content playback applications, productivity applications (e.g., word processing applications, spreadsheet applications), social network applications, and so forth.

Figure 3:
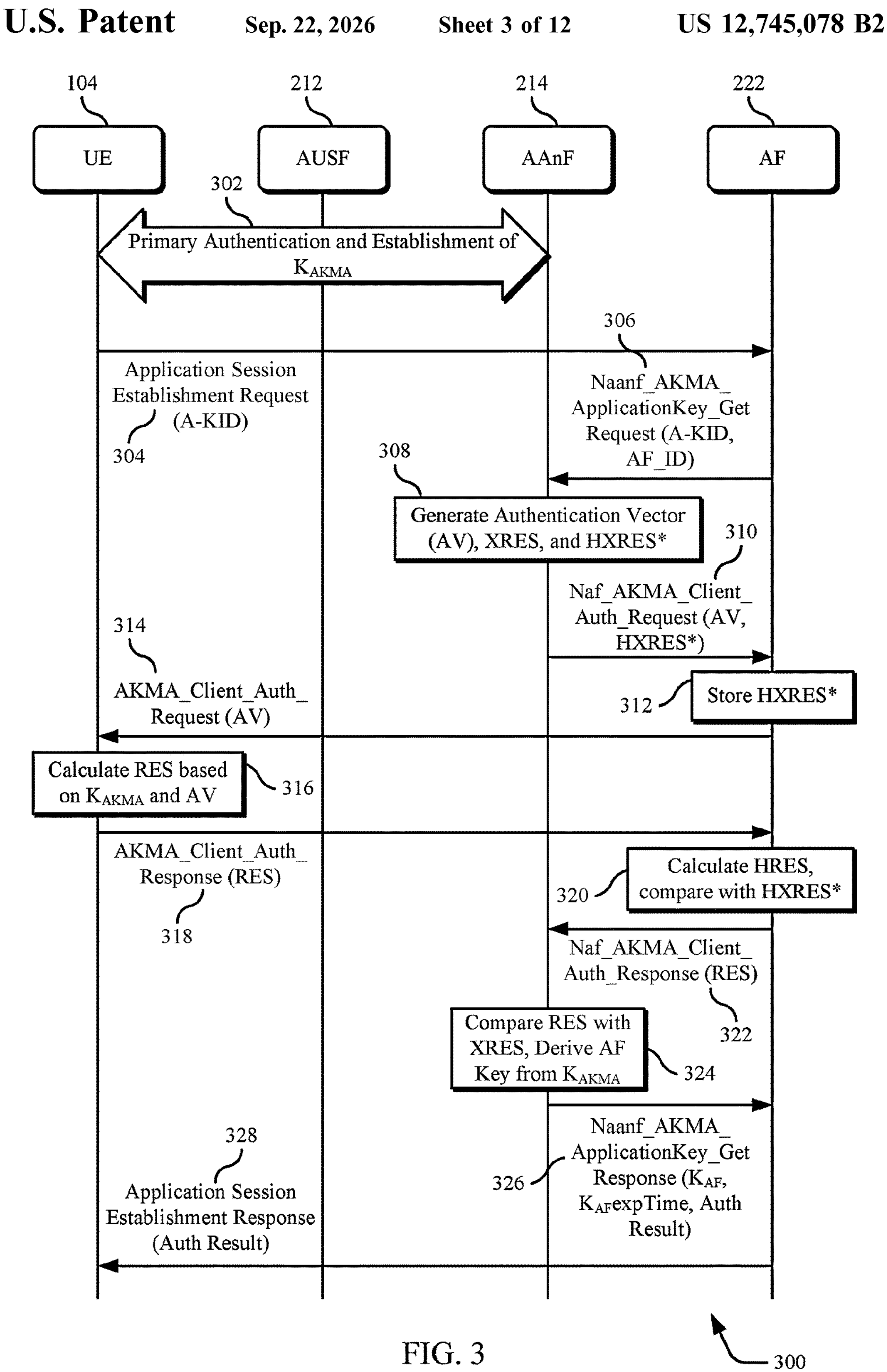
FIG. 3 illustrates an example authentication procedure with an AAnF as an authentication server that supports UE authentication for applications in accordance with aspects of the present disclosure.

FIG. 3 illustrates an example authentication procedure 300 with the AAnF as an authentication server that supports UE authentication for applications in accordance with aspects of the present disclosure. The authentication procedure 300 is used for the AF 222 (which supports AKMA and thus is also referred to as an AKMA AF) to request application function specific AKMA keys from the AAnF, especially when the AF is located outside the operator's network. In one or more implementations, authentication procedure 300 is based on the clause 6.2 of 3GPP TS 33.535 on "Authentication and Key Management for Applications (AKMA) based on 3GPP credentials in the 5G System (5GS) (Release 17)", V17.3.0, September 2021 and integrates a process for client authentication.

In one or more implementations, before communication between the UE 104 and the AF 222 starts, the UE 104 and the AF 222 determine whether to use AKMA. Whether to use AKMA is implicit to the specific application on the UE 104 and the AF 222 or indicated by the AF 222 to the UE 104.

At 302, primary authentication of the UE 104 and establishment of the $K_{AKMA}$ IS performed based on communication between the UE 104 and AAnF 214. The UE 104 generates the $K_{AKMA}$ as well as the A-KID from an AUSF key ($K_{AUSF}$). This authentication and generation of $K_{AKMA}$ and $K_{AUSF}$ is performed before initiating communication with an AF 222 that supports AKMA. The generation of $K_{AKMA}$ and $K_{AUSF}$ is performed, for example, as described in 3GPP TS 33.535 on "Authentication and Key Management for Applications (AKMA) based on 3GPP credentials in the 5G System (5GS) (Release 17)", V17.3.0, September 2021.

At 304, the UE 104 transmits an Application Session Establishment Request message to the AF 222. When the UE initiates communication with the AKMA AF 222, it includes the derived A-KID in the Application Session Establishment Request message. The UE 104 may derive $K_{AF}$ before sending the Application Session Establishment Request message or afterwards.

At 306, if the AF 222 does not have an active context associated with the A-KID, then the AF 222 selects the AAnF 214 and sends a Naanf_AKMA_ApplicationKey_Get request to the AAnF 214 with the A-KID to request the $K_{AF}$ for the UE 104. The AF 222 also includes its AF_ID in the Naanf_AKMA_ApplicationKey_Get request. The AF_ID consists of the fully qualified domain name (FQDN) of the AF and the Ua* security protocol identifier. The latter parameter identifies the security protocol that the AF 222 will use with the UE 104.

The AAnF 214 checks whether the AAnF 214 can provide the service to the AF 222 based on the configured local policy or based on the authorization information or policy provided by the Network Repository Function (NRF) using the AF_ID. If it does not succeed, the AAnF rejects the procedure. If it succeeds, the AAnF 214 verifies whether the subscriber is authorized to use AKMA based on the presence of the UE 104 specific $K_{AKMA}$ key identified by the A-KID. If $K_{AKMA}$ is present in the AAnF 214, the AAnF 214 continues with 308 below. If $K_{AKMA}$ is not present in the AAnF 214, the AAnF 214 continues with an error response (e.g., in 328 below).

At 308, the AAnF 214 decides that client authentication is required, e.g. based on the AF ID or A-KID or the SUPI of the UE 104. The AAnF 214 creates an AV, which represents the challenge for the UE 104. The AV may contain any of a random number (RAND) and an authentication token (AUTN), as used in IETF RFC 5448: "Improved Extensible Authentication Protocol Method for 3$^{rd}$ Generation Authentication and Key Agreement (EAP-AKA')," May 2009 or 3GPP TS 33.501 on "Security architecture and procedures for 5G System (Release 17)", V17.3.0, September 2021, a message authentication code (MAC), e.g. generated with an HMAC-SHA-256-128 algorithm, a sequence number (SQN) and a KDF indication, and so forth.

The AAnF 214 may compute or generate the XRES similar to the techniques in 3GPP TS 33.535 on "Authentication and Key Management for Applications (AKMA) based on 3GPP credentials in the 5G System (5GS) (Release 17)", V17.3.0, September 2021, e.g., here XRES=KDF ($K_{AKMA}$, RAND). The input to the KDF is not limited to the two parameters, e.g., the SUPI, AKMA temporary UE identifier (A-TID), the SQN, etc. could be used as additional inputs. The AAnF 214 may use a MAC function instead of a KDF for the XRES computation as in 3GPP TS 33.105 "Cryptographic algorithm requirements (Release 16)", V16.0.0, July 2020. The AAnF 214 may compute an HXRES*, e.g., as 128 least significant bits of the output of the SHA-256 function.

At 310, the AAnF 214 sends an AKMA Client Authentication Request (Naf_AKMA_Client_Auth_Request) with the AV to the AF 222. The request may contain the HXRES*, e.g., the decision of inclusion of the HXRES* may be based on AF_ID or local policy and configuration in the AAnF 214.

At 312, if the HXRES* is present in the Client Authentication Request, then the AF 222 stores the HXRES*

At 314, the AF 222 sends a Client Authentication Request (AKMA_Client_Auth_Request) including the AV to the UE 104.

At 316, the UE 104 computes or generates similar to the AAnF 214 the RES based on the $K_{AKMA}$ and the AV. E.g., the UE 104 computes or generates the RES in the same manner as the AAnF 214 generates the XRES at 308.

At 318, the UE 104 sends the Client Authentication Response (AKMA_Client_Auth_Response) including the RES to the AF 222.

At 320, if the AF 222 received the HXRES* from the AAnF 214, then the AF 222 computes an HRES from the RES in the AKMA_Client_Auth_Response, and compares the HRES with the HXRES*. The HRES may be truncated in a similar way as the HXRES* computation, e.g. the 128 least significant bits of the output of the SHA-256 function. The AF 222 compares HRES and HXRES*. If they coincide (e.g., match or are the same), the AF 222 considers the authentication successful from the AF 222 point of view. If not, the AF 222 considers authentication as failed, and indicates a failure to the AAnF 214.

At 322, the AF 222 sends an AKMA Client Authentication Response (Naf_AKMA_Client_Auth_Response) with the RES to the AAnF 214.

At 324, the AAnF 214 compares the RES with the XRES and if they coincide (e.g., match or are the same), the AAnF 214 considers the authentication as successful, otherwise, the authentication is considered as failed. Additionally or alternatively, if the Naf_AKMA_Client_Auth_Response indicates failure (e.g., due to the HRES and HXRES* not coinciding), the AAnF 214 considers the authentication as failed, optionally without comparing the RES and the XRES. If the authentication is successful, the AAnF 214 derives the $K_{AF}$ from the $K_{AKMA}$ if it does not already have the $K_{AF}$. The $K_{AF}$ is derived, for example, as in 3GPP TS 33.501 on "Security architecture and procedures for 5G System (Release 17)", V17.3.0, September 2021. For example, the $K_{AF}$ may be computed as $K_{AF}$=KDF ($K_{AKMA}$, AF_ID), where any of a variety of KDFs may be used.

At 326, if the authentication is successful and the AAnF 214 derives $K_{AF}$, the AAnF 214 sends a Naanf_AKMA_ApplicationKey_Get response to the AF 222 with the $K_{AF}$ and optionally a $K_{AF}$ expiration time. The Naanf_AKMA_ApplicationKey_Get response may include the authentication result (Auth Result), such as a success or failure indication.

At 328, the AF 222 sends the Application Session Establishment Response to the UE 104 and may include the Auth Result. If the information in the Naanf_AKMA_ApplicationKey_Get response at 326 indicates failure of the AKMA key request, the AF 222 rejects the Application Session Establishment by including a failure cause. Afterwards, the UE 104 may trigger a new Application Session Establishment request with the latest A-KID to the AKMA AF 222.

Figure 4:
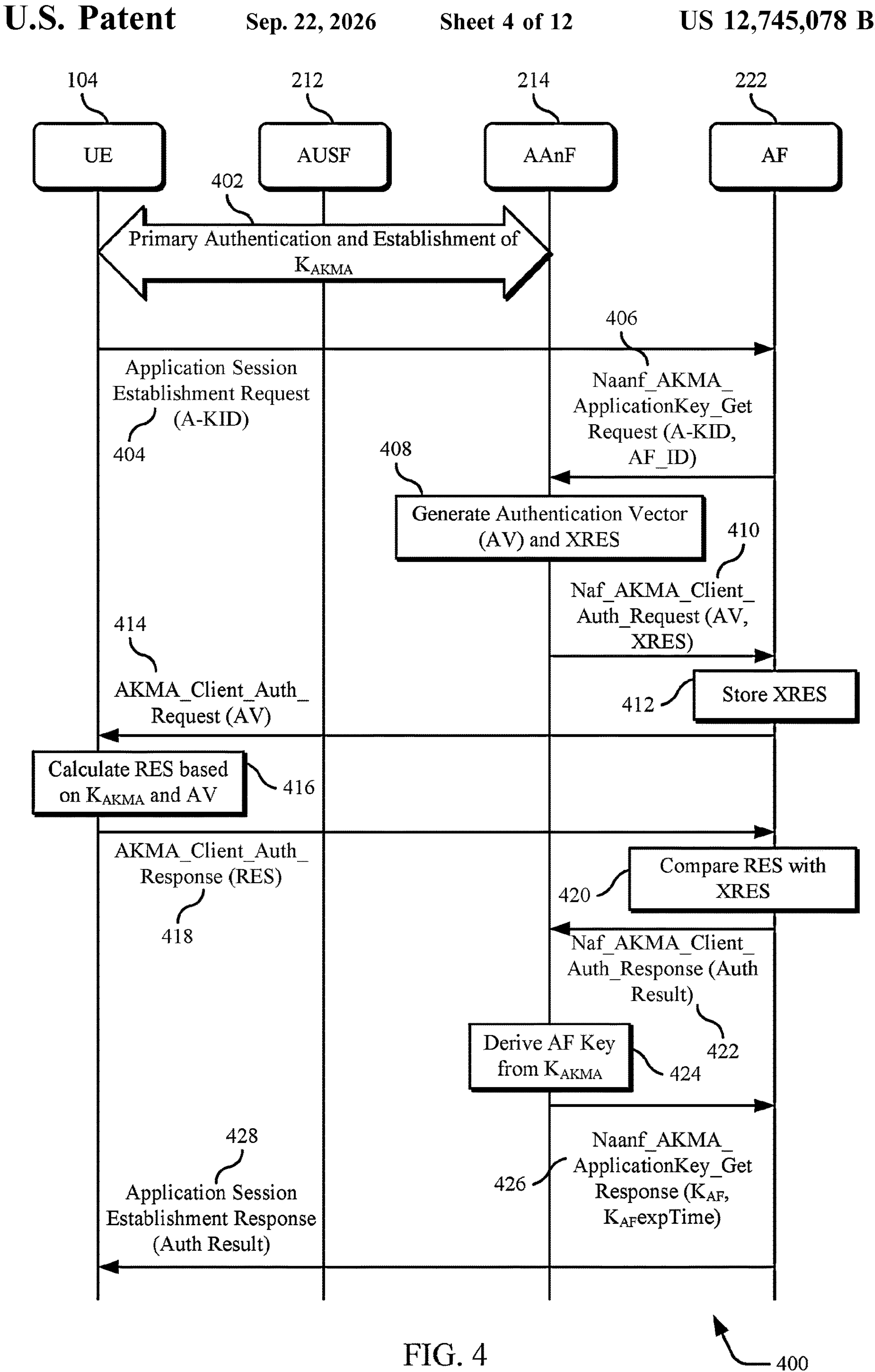
FIG. 4 illustrates an example authentication procedure with an AAnF as an authentication server that supports UE authentication for applications in accordance with aspects of the present disclosure.

FIG. 4 illustrates an example authentication procedure 400 with the AAnF as an authentication server that supports UE authentication for applications in accordance with aspects of the present disclosure. The authentication procedure 400 is used for the AF 222 (which supports AKMA and thus is also referred to as an AKMA AF) to request application function specific AKMA keys from the AAnF, especially when the AF is located outside the operator's network. In one or more implementations, authentication procedure 400 is based on the clause 6.2 of 3GPP TS 33.535 on "Authentication and Key Management for Applications (AKMA) based on 3GPP credentials in the 5G System (5GS) (Release 17)", V17.3.0, September 2021 and integrates a process for client authentication.

In one or more implementations, before communication between the UE 104 and the AF 222 starts, the UE 104 and the AF 222 determine whether to use AKMA. Whether to use AKMA is implicit to the specific application on the UE 104 and the AF 222 or indicated by the AF 222 to the UE 104.

At 402, primary authentication of the UE 104 and establishment of the $K_{AKMA}$ IS performed based on communication between the UE 104 and AAnF 214. The UE 104 generates the $K_{AKMA}$ as well as the A-KID from a $K_{AUSF}$. This authentication and generation of $K_{AKMA}$ and $K_{AUSF}$ is performed before initiating communication with an AF 222 that supports AKMA. The generation of $K_{AKMA}$ and $K_{AUSF}$ is performed, for example, as described in 3GPP TS 33.535 on "Authentication and Key Management for Applications (AKMA) based on 3GPP credentials in the 5G System (5GS) (Release 17)", V17.3.0, September 2021.

At 404, the UE 104 transmits an Application Session Establishment Request message to the AF 222. When the UE initiates communication with the AKMA AF 222, it includes the derived A-KID in the Application Session Establishment Request message. The UE 104 may derive $K_{AF}$ before sending the Application Session Establishment Request message or afterwards.

At 406, if the AF 222 does not have an active context associated with the A-KID, then the AF 222 selects the AAnF 214 and sends a Naanf_AKMA_ApplicationKey_Get request to the AAnF 214 with the A-KID to request the $K_{AF}$ for the UE 104. The AF 222 also includes its AF_ID in the Naanf_AKMA_ApplicationKey_Get request. The AF_ID consists of the FQDN of the AF and the Ua* security protocol identifier. The latter parameter identifies the security protocol that the AF 222 will use with the UE 104.

The AAnF 214 checks whether the AAnF 214 can provide the service to the AF 222 based on the configured local policy or based on the authorization information or policy provided by the NRF using the AF_ID. If it does not succeed, the AAnF rejects the procedure. If it succeeds, the AAnF 214 verifies whether the subscriber is authorized to use AKMA based on the presence of the UE 104 specific $K_{AKMA}$ key identified by the A-KID. If $K_{AKMA}$ is present in the AAnF 214, the AAnF 214 continues with 408 below. If $K_{AKMA}$ is not present in the AAnF 214, the AAnF 214 continues with an error response (e.g., in 428 below).

At 408, the AAnF 214 decides that client authentication is required, e.g. based on the AF_ID or A-KID or the SUPI of the UE 104. The AAnF 214 creates an AV, which represents the challenge for the UE 104. The AV may contain any of a RAND and an AUTN, as used in IETF RFC 5448: "Improved Extensible Authentication Protocol Method for 3rd Generation Authentication and Key Agreement (EAP-AKA')," May 2009 or 3GPP TS 33.501on "Security architecture and procedures for 5G System (Release 17)", V17.3.0, September 2021,a MAC, e.g. generated with an HMAC-SHA-256-128 algorithm, an SQN and a KDF indication, and so forth.

The AAnF 214 may compute or generate the XRES similar to the techniques in 3GPP TS 33.535 on "Authentication and Key Management for Applications (AKMA) based on 3GPP credentials in the 5G System (5GS) (Release 17)", V17.3.0, September 2021, e.g., here XRES=KDF ($K_{AKMA}$, RAND). The input to the KDF is not limited to the two parameters, e.g., the SUPI, the A-TID, the SQN, etc. could be used as additional inputs. The AAnF 214 may use a MAC function instead of a KDF for the XRES computation as in 3GPP TS 33.105 "Cryptographic algorithm requirements (Release 16)", V16.0.0, July 2020.

At 410, the AAnF 214 sends an AKMA Client Authentication Request (Naf_AKMA_Client_Auth_Request) with the AV and the XRES.

At 412, the AF 222 stores the XRES.

At 414, the AF 222 sends a Client Authentication Request (AKMA_Client_Auth_Request) including the AV to the UE 104.

At 416, the UE 104 computes or generates similar to the AAnF 214 the RES based on the $K_{AKMA}$ and the AV. E.g., the UE 104 computes or generates the RES in the same manner as the AAnF 214 generates the XRES at 408.

At 418, the UE 104 sends the Client Authentication Response (AKMA_Client_Auth_Response) including the RES to the AF 222.

At 420, the AF 222 compares RES and XRES. If they coincide (e.g., match or are the same), the AF 222 considers the authentication successful from the AF 222 point of view. If not, the AF 222 considers authentication as failed, and indicates a failure to the AAnF 214.

At 422, the AF 222 sends an AKMA Client Authentication Response (Naf_AKMA_Client_Auth_Response) with the authentication result (e.g., failure or success based on whether the AF 222 determines at 420 that the RES and XRES coincide) to the AAnF 214.

At 424, if the authentication was successful, the AAnF 214 derives the $K_{AF}$ from the $K_{AKMA}$ if it does not already have the $K_{AF}$. The $K_{AF}$ is derived, for example, as in 3GPP TS 33.501 on "Security architecture and procedures for 5G System (Release 17)", V17.3.0,September 2021. For example, the $K_{AF}$ may be computed as $K_{AF}$=KDF ($K_{AKMA}$, AF_ID), where any of a variety of KDFs may be used.

At 426, if the authentication was successful, the AAnF 214 sends a Naanf_AKMA_ApplicationKey_Get response to the AF 222 with the $K_{AF}$ and optionally a $K_{AF}$ expiration time. The Naanf_AKMA_ApplicationKey_Get response may include the authentication result, such as a success or failure indication.

At 428, the AF 222 sends the Application Session Establishment Response to the UE 104 and may include the authentication result. If the information in the Naanf_AKMA_ApplicationKey_Get response at 426 indicates failure of the AKMA key request, the AF 222 rejects the Application Session Establishment by including a failure cause. Afterwards, the UE 104 may trigger a new Application Session Establishment request with the latest A-KID to the AKMA AF 222.

Figure 5:
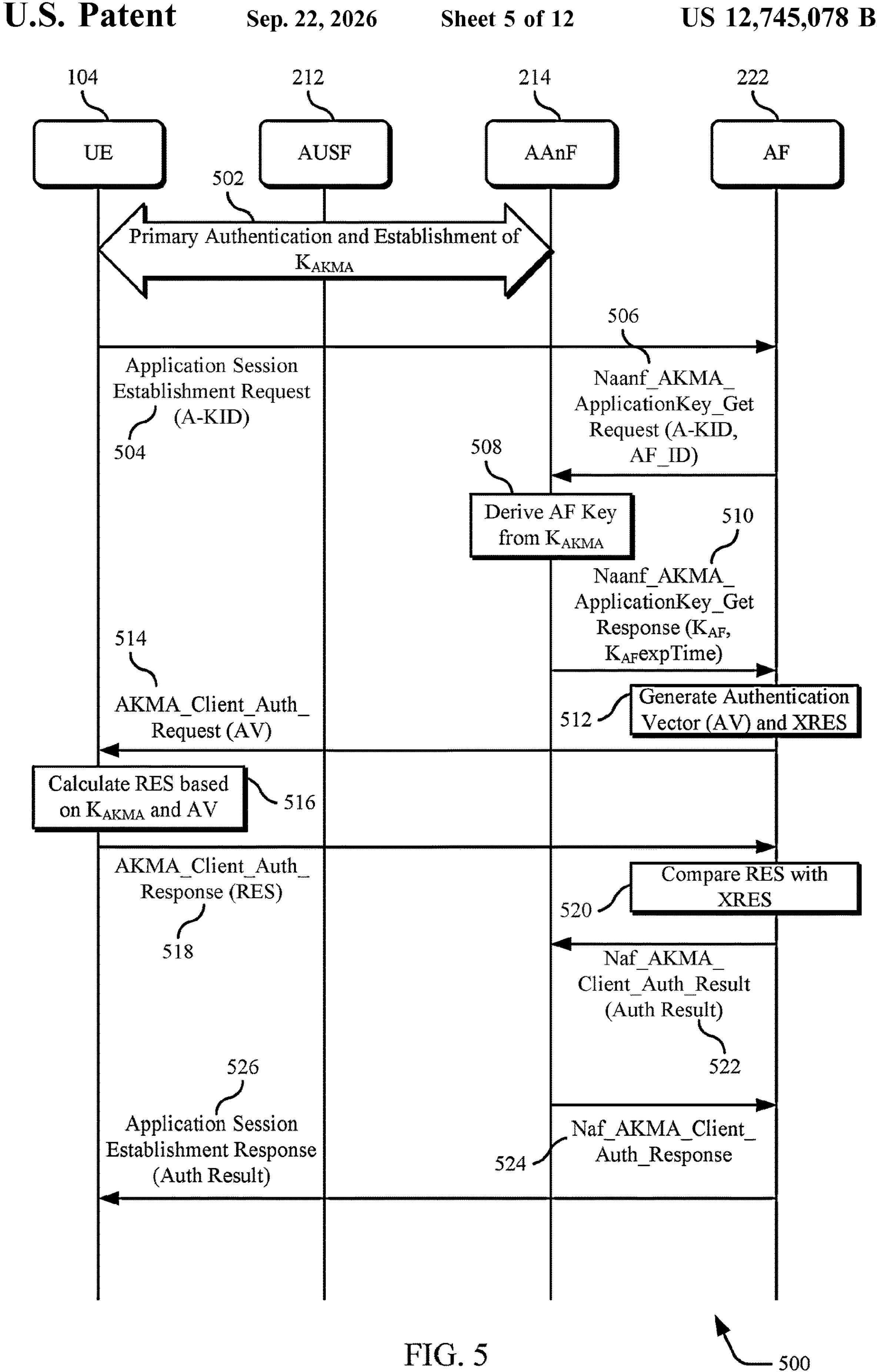
FIG. 5 illustrates an example authentication procedure with an AAnF as an authentication server that supports UE authentication for applications in accordance with aspects of the present disclosure.

FIG. 5 illustrates an example authentication procedure 500 with the AAnF as an authentication server that supports UE authentication for applications in accordance with aspects of the present disclosure. The authentication procedure 500 is used by the AF 222 (which supports AKMA and thus is also referred to as an AKMA AF) to request application function specific AKMA keys from the AAnF, especially when the AF is located outside the operator's network. In one or more implementations, authentication procedure 500 is based on the clause 6.2 of 3GPP TS 33.535 on "Authentication and Key Management for Applications (AKMA) based on 3GPP credentials in the 5G System (5GS) (Release 17)", V17.3.0, September 2021 and integrates a process for client authentication.

In one or more implementations, before communication between the UE 104 and the AF 222 starts, the UE 104 and the AF 222 determine whether to use AKMA. Whether to use AKMA is implicit to the specific application on the UE 104 and the AF 222 or indicated by the AF 222 to the UE 104.

At 502, primary authentication of the UE 104 and establishment of the $K_{AKMA}$ IS performed based on communication between the UE 104 and AAnF 214. The UE 104 generates the $K_{AKMA}$ as well as the A-KID from a $K_{AUSF}$. This authentication and generation of $K_{AKMA}$ and $K_{AUSF}$ is performed before initiating communication with an AF 222 that supports AKMA. The generation of $K_{AKMA}$ and $K_{AUSF}$ is performed, for example, as described in 3GPP TS 33.535 on "Authentication and Key Management for Applications (AKMA) based on 3GPP credentials in the 5G System (5GS) (Release 17)", V17.3.0, September 2021.

At 504, the UE 104 transmits an Application Session Establishment Request message to the AF 222. When the UE initiates communication with the AKMA AF 222, it includes the derived A-KID in the Application Session Establishment Request message. The UE 104 may derive $K_{AF}$ before sending the Application Session Establishment Request message or afterwards.

At 506, if the AF 222 does not have an active context associated with the A-KID, then the AF 222 selects the AAnF 214 and sends a Naanf_AKMA_ApplicationKey_Get request to the AAnF 214 with the A-KID to request the $K_{AF}$ for the UE 104. The AF 222 also includes its AF_ID in the Naanf_AKMA_ApplicationKey_Get request. The AF_ID consists of the FQDN of the AF and the Ua* security protocol identifier. The latter parameter identifies the security protocol that the AF 222 will use with the UE 104.

The AAnF 214 checks whether the AAnF 214 can provide the service to the AF 222 based on the configured local policy or based on the authorization information or policy provided by the NRF using the AF_ID. If it does not succeed, the AAnF rejects the procedure. If it succeeds, the AAnF 214 verifies whether the subscriber is authorized to use AKMA based on the presence of the UE 104 specific $K_{AKMA}$ key identified by the A-KID. If $K_{AKMA}$ is present in the AAnF 214, the AAnF 214 continues with 508 below. If $K_{AKMA}$ is not present in the AAnF 214, the AAnF 214 continues with an error response (e.g., in 526 below).

At 508, the AAnF 214 derives the $K_{AF}$ from the $K_{AKMA}$ if it does not already have the $K_{AF}$. The $K_{AF}$ is derived, for example, as in 3GPP TS 33.501 on "Security architecture and procedures for 5G System (Release 17)", V17.3.0, September 2021. For example, the $K_{AF}$ may be computed as $K_{AF}$=KDF ($K_{AKMA}$, AF_ID), where any of a variety of KDFs may be used.

At 510, the AAnF 214 sends a Naanf_AKMA_ApplicationKey_Get response to the AF 222 with the $K_{AF}$ and a $K_{AF}$ expiration time.

At 512, the AF 222 decides that client authentication is required, e.g. based on the AF_ID or A-KID or the SUPI of the UE 104. The AF 222 creates an AV, which represents the challenge for the UE 104. The AV may contain any of a RAND and an AUTN, as used in IETF RFC 5448: "Improved Extensible Authentication Protocol Method for 3rd Generation Authentication and Key Agreement (EAP-AKA')," May 2009 or 3GPP TS 33.501 on "Security architecture and procedures for 5G System (Release 17)", V17.3.0, September 2021, a MAC, e.g. generated with an HMAC-SHA-256-128 algorithm, an SQN and a KDF indication, and so forth.

The AF 222 may compute or generate the XRES similar to the techniques in 3GPP TS 33.535 on "Authentication and Key Management for Applications (AKMA) based on 3GPP credentials in the 5G System (5GS) (Release 17)", V17.3.0, September 2021, e.g., here XRES=KDF($K_{AKMA}$, RAND). The input to the KDF is not limited to the two parameters, e.g., the SUPI, the A-TID, the SQN, etc. could be used as additional inputs. The AF 222 may use a MAC function instead of a KDF for the XRES computation as in 3GPP TS 33.105 "Cryptographic algorithm requirements (Release 16)", V16.0.0, July 2020.

At 514, the AF 222 sends a Client Authentication Request (AKMA_Client_Auth_Request) including the AV to the UE 104.

At 516, the UE 104 computes or generates similar to the AF 222 the RES based on the $K_{AKMA}$ and the AV. E.g., the UE 104 computes or generates the RES in the same manner as the AF generates the XRES at 512.

At 518, the UE 104 sends the Client Authentication Response (AKMA_Client_Auth_Response) including the RES to the AF 222.

At 520, the AF 222 compares RES and XRES. If they coincide (e.g., match or are the same), the AF 222 considers the authentication successful from the AF 222 point of view. If not, the AF 222 considers authentication as failed, and indicates a failure to the AAnF 214.

At 522, the AF 222 may send an AKMA Client Authentication Response (Naf_AKMA_Client_Auth_Response) with the authentication result (e.g., failure or success based on whether the AF 222 determines at 520 that the RES and XRES coincide) to the AAnF 214.

At 524, the AAnF 214 sends a Naf_AKMA_Client_Auth_Response to the AF 222 that acknowledges the AKMA Client Authentication Result message to the AF.

At 526, the AF 222 sends the Application Session Establishment Response to the UE 104 and may include the authentication result. If the comparison at 520 indicates failure of the AKMA key request, the AF 222 rejects the Application Session Establishment by including a failure cause. Afterwards, the UE 104 may trigger a new Application Session Establishment request with the latest A-KID to the AKMA AF 222.

Figure 6:
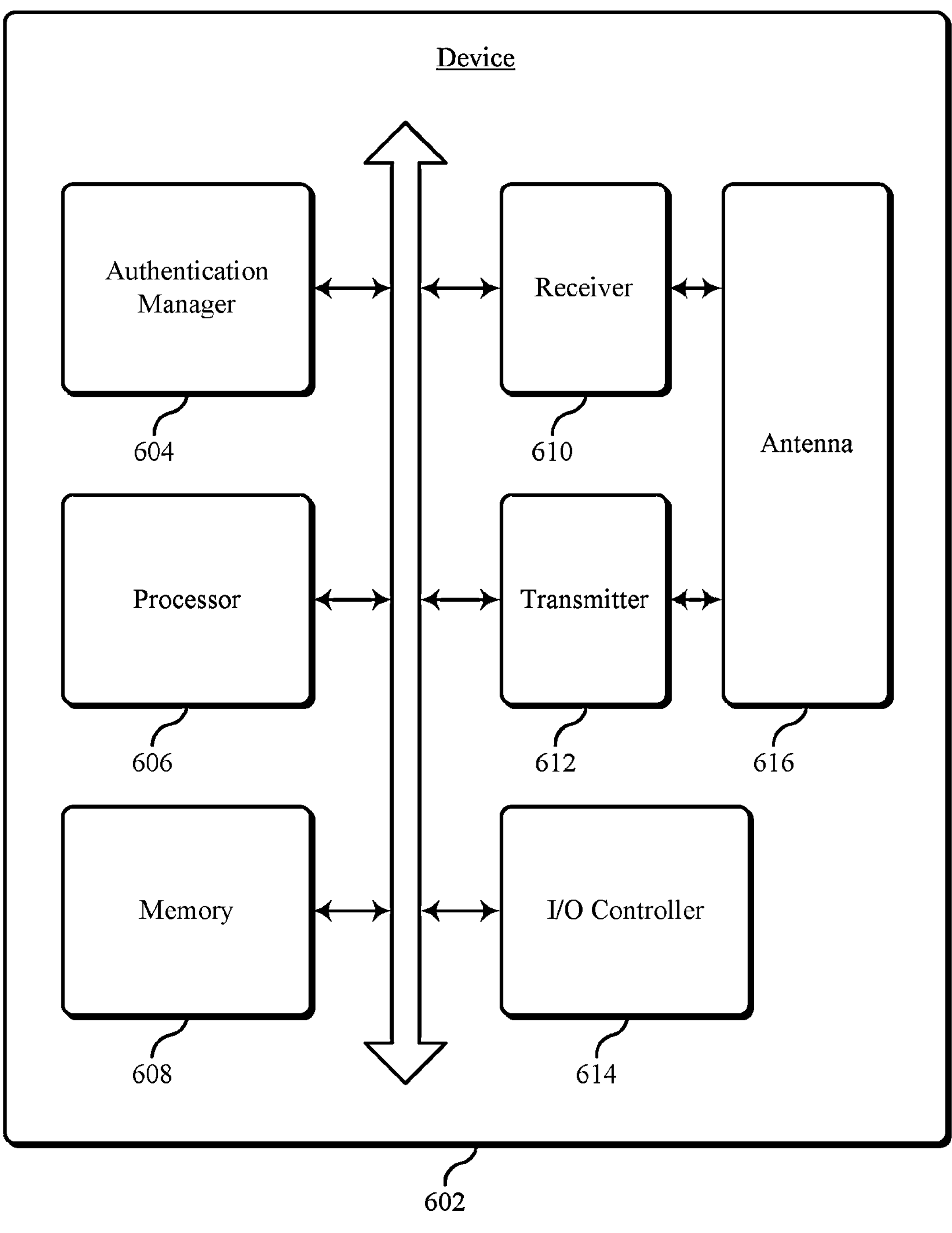
FIG. 6 illustrates an example of a block diagram of a device that supports UE authentication for applications in accordance with aspects of the present disclosure.

FIG. 6 illustrates an example of a block diagram 600 of a device 602 that supports UE authentication for applications in accordance with aspects of the present disclosure. The device 602 may be an example of a UE 104 as described herein. The device 602 may support wireless communication with one or more base stations 102, UEs 104, or any combination thereof. The device 602 may include components for bi-directional communications including components for transmitting and receiving communications, such as an authentication manager 604, a processor 606, a memory 608, a receiver 610, a transmitter 612, and an I/O controller 614. These components may be in electronic communication or otherwise coupled (e.g., operatively, communicatively, functionally, electronically, electrically) via one or more interfaces (e.g., buses).

The authentication manager 604, the receiver 610, the transmitter 612, or various combinations thereof or various components thereof may be examples of means for performing various aspects of the present disclosure as described herein. For example, the authentication manager 604, the receiver 610, the transmitter 612, or various combinations or components thereof may support a method for performing one or more of the functions described herein.

In some implementations, the authentication manager 604, the receiver 610, the transmitter 612, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 606 and the memory 608 coupled with the processor 606 may be configured to perform one or more of the functions described herein (e.g., by executing, by the processor 606, instructions stored in the memory 608).

Additionally or alternatively, in some implementations, the authentication manager 604, the receiver 610, the transmitter 612, or various combinations or components thereof may be implemented in code (e.g., as communications management software or firmware) executed by the processor 606. If implemented in code executed by the processor 606, the functions of the authentication manager 604, the receiver 610, the transmitter 612, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the authentication manager 604 may be configured to perform various operations (e.g., receiving, monitoring, transmitting) using or otherwise in cooperation with the receiver 610, the transmitter 612, or both. For example, the authentication manager 604 may receive information from the receiver 610, send information to the transmitter 612, or be integrated in combination with the receiver 610, the transmitter 612, or both to receive information, transmit information, or perform various other operations as described herein. Although the authentication manager 604 is illustrated as a separate component, in some implementations, one or more functions described with reference to the authentication manager 604 may be supported by or performed by the processor 606, the memory 608, or any combination thereof. For example, the memory 608 may store code, which may include instructions executable by the processor 606 to cause the device 602 to perform various aspects of the present disclosure as described herein, or the processor 606 and the memory 608 may be otherwise configured to perform or support such operations.

For example, the authentication manager 604 may support wireless communication at a device (e.g., the device 602, a UE) in accordance with examples as disclosed herein. The authentication manager 604 and/or other device components may be configured as or otherwise support a means for wireless communication at a device including generating a first request message to establish an application session with an application function on another apparatus, the first request message including a key identifier corresponding to the user equipment, the key identifier identifying an authentication and key management for applications anchor key corresponding to the user equipment and having been previously generated based on communication with an authentication server function; transmitting, to the application function, the first request message; receiving, from the application function, a second request message including an authentication vector; generating a challenge result based on the authentication and key management for applications anchor key and the authentication vector; generating a first response message including the challenge result; transmitting, to the application function, the first response message; and receiving, from the application function, a second response message including an authorization result indicating failure or success of the first request message.

Additionally, wireless communication at the device includes any one or combination of: where the authentication vector comprises a random number; generating the challenge result includes generating the challenge result using the authentication and key management for applications anchor key corresponding to the user equipment, the authentication vector, and a key derivation function.

Additionally, a device for wireless communication includes a transceiver; and a processor coupled to the transceiver, the processor and the transceiver configured to cause the apparatus to: generate a first request message to establish an application session with an application function on another apparatus, the first request message including a key identifier corresponding to a user equipment, the key identifier identifying an authentication and key management for applications anchor key corresponding to the user equipment and having been previously generated based on communication with an authentication server function; transmit, to the application function, the first request message; receive, from the application function, a second request message including an authentication vector; generate a challenge result based on the authentication and key management for applications anchor key and the authentication vector and generate a first response message including the challenge result; transmit, to the application function, the first response message; and receive, from the application function message, a second response including an authorization result indicating failure or success of the first request message.

Additionally, the device for wireless communication includes any one or combination of: where the authentication vector comprises a random number; where to generate the challenge result is to generate the challenge result using the authentication and key management for applications anchor key corresponding to the user equipment, the authentication vector, and a key derivation function.

The processor 606 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 606 may be configured to operate a memory array using a memory controller. In some other implementations, a memory controller may be integrated into the processor 606. The processor 606 may be configured to execute computer-readable instructions stored in a memory (e.g., the memory 608) to cause the device 602 to perform various functions of the present disclosure.

The memory 608 may include random access memory (RAM) and read-only memory (ROM). The memory 608 may store computer-readable, computer-executable code including instructions that, when executed by the processor 606 cause the device 602 to perform various functions described herein. The code may be stored in a non-transitory computer-readable medium such as system memory or another type of memory. In some implementations, the code may not be directly executable by the processor 606 but may cause a computer (e.g., when compiled and executed) to perform functions described herein. In some implementations, the memory 608 may include, among other things, a basic I/O system (BIOS) which may control basic hardware or software operation such as the interaction with peripheral components or devices.

The I/O controller 614 may manage input and output signals for the device 602. The I/O controller 614 may also manage peripherals not integrated into the device 602. In some implementations, the I/O controller 614 may represent a physical connection or port to an external peripheral. In some implementations, the I/O controller 614 may utilize an operating system such as iOS®, ANDROID®, MS-DOS®, MS-WINDOWS®, OS/2®, UNIX®, LINUX®, or another known operating system. In some implementations, the I/O controller 614 may be implemented as part of a processor, such as the processor 606. In some implementations, a user may interact with the device 602 via the I/O controller 614 or via hardware components controlled by the I/O controller 614.

In some implementations, the device 602 may include a single antenna 616. However, in some other implementations, the device 602 may have more than one antenna 616, which may be capable of concurrently transmitting or receiving multiple wireless transmissions. The receiver 610 and the transmitter 612 may communicate bi-directionally, via the one or more antennas 616, wired, or wireless links as described herein. For example, the receiver 610 and the transmitter 612 may represent a wireless transceiver and may communicate bi-directionally with another wireless transceiver. The transceiver may also include a modem to modulate the packets, to provide the modulated packets to one or more antennas 616 for transmission, and to demodulate packets received from the one or more antennas 616.

Figure 7:
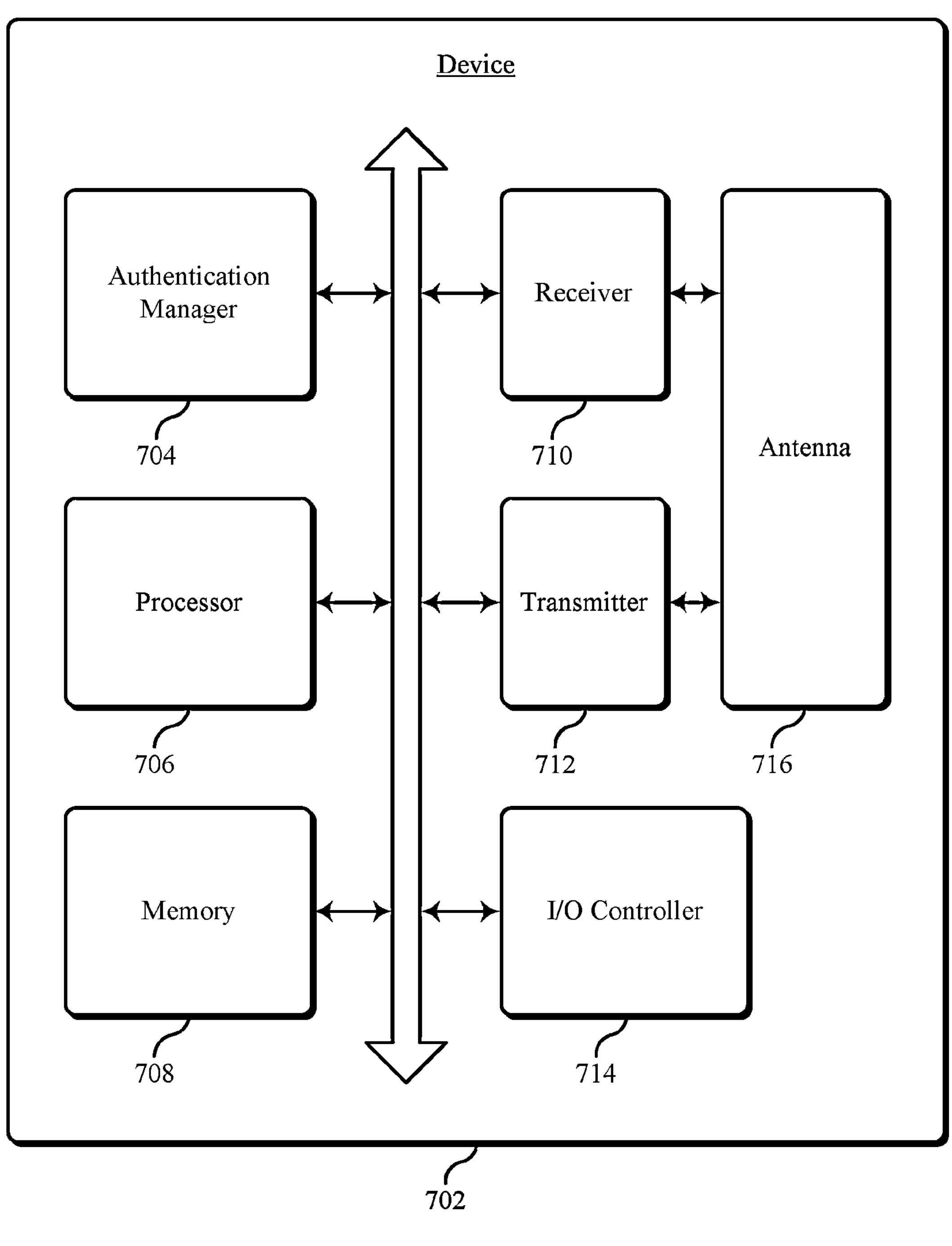
FIG. 7 illustrates an example of a block diagram of a device that supports UE authentication for applications in accordance with aspects of the present disclosure.

FIG. 7 illustrates an example of a block diagram 700 of a device 702 that supports UE authentication for applications in accordance with aspects of the present disclosure. The device 702 may also be an example of a device implementing an AAnF 214 as described herein or a device implementing an AF 222 as described herein. The device 702 may support wireless communication and/or network signaling with one or more base stations 102, UEs 104, NTSs 108, or any combination thereof. The device 702 may include components for bi-directional communications including components for transmitting and receiving communications, such as an authentication manager 704, a processor 706, a memory 708, a receiver 710, a transmitter 712, and an I/O controller 714. These components may be in electronic communication or otherwise coupled (e.g., operatively, communicatively, functionally, electronically, electrically) via one or more interfaces (e.g., buses).

The authentication manager 704, the receiver 710, the transmitter 712, or various combinations thereof or various components thereof may be examples of means for performing various aspects of the present disclosure as described herein. For example, the authentication manager 704, the receiver 710, the transmitter 712, or various combinations or components thereof may support a method for performing one or more of the functions described herein.

In some implementations, the authentication manager 704, the receiver 710, the transmitter 712, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 706 and the memory 708 coupled with the processor 706 may be configured to perform one or more of the functions described herein (e.g., by executing, by the processor 706, instructions stored in the memory 708).

Additionally or alternatively, in some implementations, the authentication manager 704, the receiver 710, the transmitter 712, or various combinations or components thereof may be implemented in code (e.g., as communications management software or firmware) executed by the processor 706. If implemented in code executed by the processor 706, the functions of the authentication manager 704, the receiver 710, the transmitter 712, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the authentication manager 704 may be configured to perform various operations (e.g., receiving, monitoring, transmitting) using or otherwise in cooperation with the receiver 710, the transmitter 712, or both. For example, the authentication manager 704 may receive information from the receiver 710, send information to the transmitter 712, or be integrated in combination with the receiver 710, the transmitter 712, or both to receive information, transmit information, or perform various other operations as described herein. Although the authentication manager 704 is illustrated as a separate component, in some implementations, one or more functions described with reference to the authentication manager 704 may be supported by or performed by the processor 706, the memory 708, or any combination thereof. For example, the memory 708 may store code, which may include instructions executable by the processor 706 to cause the device 702 to perform various aspects of the present disclosure as described herein, or the processor 706 and the memory 708 may be otherwise configured to perform or support such operations.

For example, the authentication manager 704 may support wireless communication at a device (e.g., the device 702, a device implementing an AAnF 214 or a device implementing an AF 222) in accordance with examples as disclosed herein. The authentication manager 704 and/or other device components may be configured as or otherwise support a means for wireless communication at a device (e.g., the device 702, a device implementing an AAnF 214 or a device implementing an AF 222), including receiving, from an application function, a request message including a key identifier corresponding to a user equipment and an application function identifier; generating an authentication vector; transmitting, to the application function, a first response message including the authentication vector; receiving, from the application function, an authentication response including a challenge result from the user equipment; deriving, in response to the challenge result matching an expected challenge result, an application key from an authentication and key management for applications anchor key corresponding to the user equipment; and transmitting, to the application function, a second response message including the application key in response to the challenge result matching the expected challenge result or a failure indication in response to the challenge result not matching the expected challenge result.

Additionally, wireless communication at the device includes any one or combination of: the second response message further including an application key expiration time; generating a hash of the expected challenge result and including the hash of the expected challenge result in the first response message; generating the expected challenge result using the authentication and key management for applications anchor key corresponding to the user equipment, the authentication vector, and a key derivation function; generating an authentication result and including the authentication result in the second response message; where the authentication result indicates success or failure; determining that authentication is required and generating the authentication vector in response to the determining that authentication is required; where the determining that authentication is required comprises determining that authentication is required based on the key identifier corresponding to the user equipment; where the determining that authentication is required comprises determining that authentication is required based on the application function identifier; where the authentication vector comprises a random number.

Additionally, the authentication manager 704 and/or other device components may be configured as or otherwise support a means for wireless communication at a device (e.g., the device 702, a device implementing an AAnF 214 or a device implementing an AF 222), including generating a first request message including a key identifier corresponding to a user equipment and an application function identifier; transmitting, to an authentication and key management for applications anchor function, the first request message; receiving, from the authentication and key management for applications anchor function, a first response message including an authentication vector; generating a second request message including the application vector; transmitting, to the user equipment, the second request message; receiving, from the user equipment, a second response including a challenge result; transmitting, to the authentication and key management for applications anchor function, a third request message for an application key; and receiving, from the authentication and key management for applications anchor function, a third response message including the application key or a failure indication.

Additionally, wireless communication at the device includes any one or combination of: where the third response message further includes an application key expiration time; further including receiving an application session establishment request including the key identifier corresponding to the user equipment, where the third response message further includes an authentication result, and transmitting, to the user equipment, an application session establishment response including the authentication result; where the authentication result indicates success or failure; where the third request message includes the challenge result and the third response message includes the application key only if the authentication and key management for applications anchor function determines that the challenge result matches an expected challenge result; where the second request message further includes a hash of an expected challenge result, and the method further comprises generating a hash of the challenge result received in the second response message, determining whether the hash of the expected challenge result matches the hash of the challenge result, and including in the third request message an indication of failure of the challenge result if the hash of the expected challenge result does not match the hash of the challenge result; where the first response message further includes an expected challenge result, and the method further comprises determining whether the challenge result received in the second response message matches the expected challenge result, and including an authentication result in the third request message indicating whether the challenge result matches the expected challenge result; where the third response message includes the application key and an application key expiration time in response to the authentication result indicating that the challenge result received in the second response message matches the expected challenge result; where receiving the first response message includes receiving the first response message in response to the authentication and key management for applications anchor function determining that authentication is required based on the key identifier corresponding to the user equipment; where receiving the first response message includes receiving the first response message in response to the authentication and key management for applications anchor function determining that authentication is required based on the application function identifier.

Additionally, the authentication manager 704 and/or other device components may be configured as or otherwise support a means for wireless communication at a device (e.g., the device 702, a device implementing an AAnF 214 or a device implementing an AF 222), including receiving an application session establishment request including a key identifier corresponding to a user equipment; generating a first request message including the key identifier corresponding to the user equipment and an application function identifier; transmitting, to an authentication and key management for applications anchor function, the first request message; receiving, from the authentication and key management for applications anchor function, a first response message including an application key; generating an authentication vector, an expected challenge result, and a second request message including the application vector; transmitting, to the user equipment, the second request message; receiving, from the user equipment, a second response message including a challenge result; determining an authentication result based on whether the challenge result received in the second response message matches the expected challenge result; generating an application session establishment response including the authentication result; and transmitting, to the user equipment, the application session establishment response.

Additionally, wireless communication at the device includes any one or combination of: where the first response message further includes an application key expiration time where the authentication result indicates success or failure; determining that authentication is required based on the key identifier corresponding to the user equipment; determining that authentication is required based on the application function identifier.

Additionally, a device for wireless communication includes a transceiver; and a processor coupled to the transceiver, the processor and the transceiver configured to cause the apparatus to: receive, from an application function, a request message including a key identifier corresponding to a user equipment and an application function identifier; generate an authentication vector; transmit, to the application function, a first response message including the generated authentication vector; receive, from the application function, an authentication response including a challenge result from the user equipment; derive, in response to the challenge result matching an expected challenge result, an application key from an authentication and key management for applications anchor key corresponding to the user equipment; and transmit, to the application function, a second response message including the application key in response to the challenge result matching the expected challenge result or a failure indication in response to the challenge result not matching the expected challenge result.

Additionally, the device for wireless communication includes any one or combination of: where the processor is further configured to cause the apparatus to generate a hash of the expected challenge result and the transceiver is further configured to cause the apparatus to include the hash of the expected challenge result in the first response message; where the processor is further configured to cause the apparatus to generate the expected challenge result using the authentication and key management for applications anchor key corresponding to the user equipment, the authentication vector, and a key derivation function; where the processor is further configured to cause the apparatus to generate an authentication result and the transceiver is further configured to cause the apparatus to include the authentication result in the second response message; where the authentication result indicates success or failure; where the processor is further configured to cause the apparatus to determine that authentication is required and to generate the authentication vector in response to determining that authentication is required; where the processor is further configured to cause the apparatus to determine that authentication is required based on the key identifier corresponding to the user equipment, on the application function identifier or a combination thereof; where the authentication vector comprises a random number; where the second response message further includes an application key expiration time.

Additionally, a device for wireless communication includes a transceiver; and a processor coupled to the transceiver, the processor and the transceiver configured to cause the apparatus to: generate a first request message including a key identifier corresponding to a user equipment and an application function identifier; transmit, to an authentication and key management for applications anchor function, the first request message; receive, from the authentication and key management for applications anchor function, a first response message including an authentication vector; generate a second request message including the application vector; transmit, to the user equipment, the second request message; receive, from the user equipment, a second response message including a challenge result; transmit, to the authentication and key management for applications anchor function, a third request message for an application key; and receive, from the authentication and key management for applications anchor function, a third response message including the application key or a failure indication.

Additionally, the device for wireless communication includes any one or combination of: where the transceiver is further configured to cause the apparatus to receive an application session establishment request including the key identifier corresponding to the user equipment, where the third response message further includes an authentication result, and the transceiver is further configured to cause the apparatus to transmit, to the user equipment, an application session establishment response including the authentication result; where the authentication result indicates success or failure; where the third request message includes the challenge result and the third response message includes the application key only if the authentication and key management for applications anchor function determines that the challenge result matches an expected challenge result; where the second request message further includes a hash of an expected challenge result, the processor is further configured to cause the apparatus to generate a hash of the challenge result received in the second response message, determine whether the hash of the expected challenge result matches the hash of the challenge result, and include in the third request message an indication of failure of the challenge result if the hash of the expected challenge result does not match the hash of the challenge result; where the first response message further includes an expected challenge result, and the processor is further configured to cause the apparatus to determine whether the challenge result received in the second response message matches the expected challenge result, and include an authentication result in the third request message indicating whether the challenge result matches the expected challenge result; where the third response message includes the application key and an application key expiration time in response to the authentication result indicating that the challenge result received in the second response message matches the expected challenge result; where to receive the first response message is to receive the first response message in response to the authentication and key management for applications anchor function determining that authentication is required based on the key identifier corresponding to the user equipment, on the application function identifier or a combination thereof.

Additionally, a device for wireless communication includes a transceiver; and a processor coupled to the transceiver, the processor and the transceiver configured to cause the apparatus to: receive an application session establishment request including a key identifier corresponding to a user equipment; generate a first request message including the key identifier corresponding to the user equipment and an application function identifier; transmit, to an authentication and key management for applications anchor function, the first request message; receive, from the authentication and key management for applications anchor function, a first response message including an application key; generate an authentication vector, an expected challenge result, and a second request message including the application vector; transmit, to the user equipment, the second request message; receive, from the user equipment, a second response message including a challenge result; determine an authentication result based on whether the challenge result received in the second response message matches the expected challenge result and generate an application session establishment response including the authentication result; and transmit, to the user equipment, the application session establishment response.

Additionally, the device for wireless communication includes any one or combination of: where the authentication result indicates success or failure; where the processor is further configured to cause the apparatus to determine that authentication is required based on the key identifier corresponding to the user equipment; where the processor is further configured to cause the apparatus to determine that authentication is required based on the application function identifier.

The processor 706 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 706 may be configured to operate a memory array using a memory controller. In some other implementations, a memory controller may be integrated into the processor 706. The processor 706 may be configured to execute computer-readable instructions stored in a memory (e.g., the memory 708) to cause the device 702 to perform various functions of the present disclosure.

The memory 708 may include random access memory (RAM) and read-only memory (ROM). The memory 708 may store computer-readable, computer-executable code including instructions that, when executed by the processor 706 cause the device 702 to perform various functions described herein. The code may be stored in a non-transitory computer-readable medium such as system memory or another type of memory. In some implementations, the code may not be directly executable by the processor 706 but may cause a computer (e.g., when compiled and executed) to perform functions described herein. In some implementations, the memory 708 may include, among other things, a basic I/O system (BIOS) which may control basic hardware or software operation such as the interaction with peripheral components or devices.

The I/O controller 714 may manage input and output signals for the device 702. The I/O controller 714 may also manage peripherals not integrated into the device 702. In some implementations, the I/O controller 714 may represent a physical connection or port to an external peripheral. In some implementations, the I/O controller 714 may utilize an operating system such as iOS®, ANDROID®, MS-DOS®, MS-WINDOWS®, OS/2®, UNIX®, LINUX®, or another known operating system. In some implementations, the I/O controller 714 may be implemented as part of a processor, such as the processor 706. In some implementations, a user may interact with the device 702 via the I/O controller 714 or via hardware components controlled by the I/O controller 714.

In some implementations, the device 702 may include a single antenna 716. However, in some other implementations, the device 702 may have more than one antenna 716, which may be capable of concurrently transmitting or receiving multiple wireless transmissions. The receiver 710 and the transmitter 712 may communicate bi-directionally, via the one or more antennas 716, wired, or wireless links as described herein. For example, the receiver 710 and the transmitter 712 may represent a wireless transceiver and may communicate bi-directionally with another wireless transceiver. The transceiver may also include a modem to modulate the packets, to provide the modulated packets to one or more antennas 716 for transmission, and to demodulate packets received from the one or more antennas 716.

Figure 8:
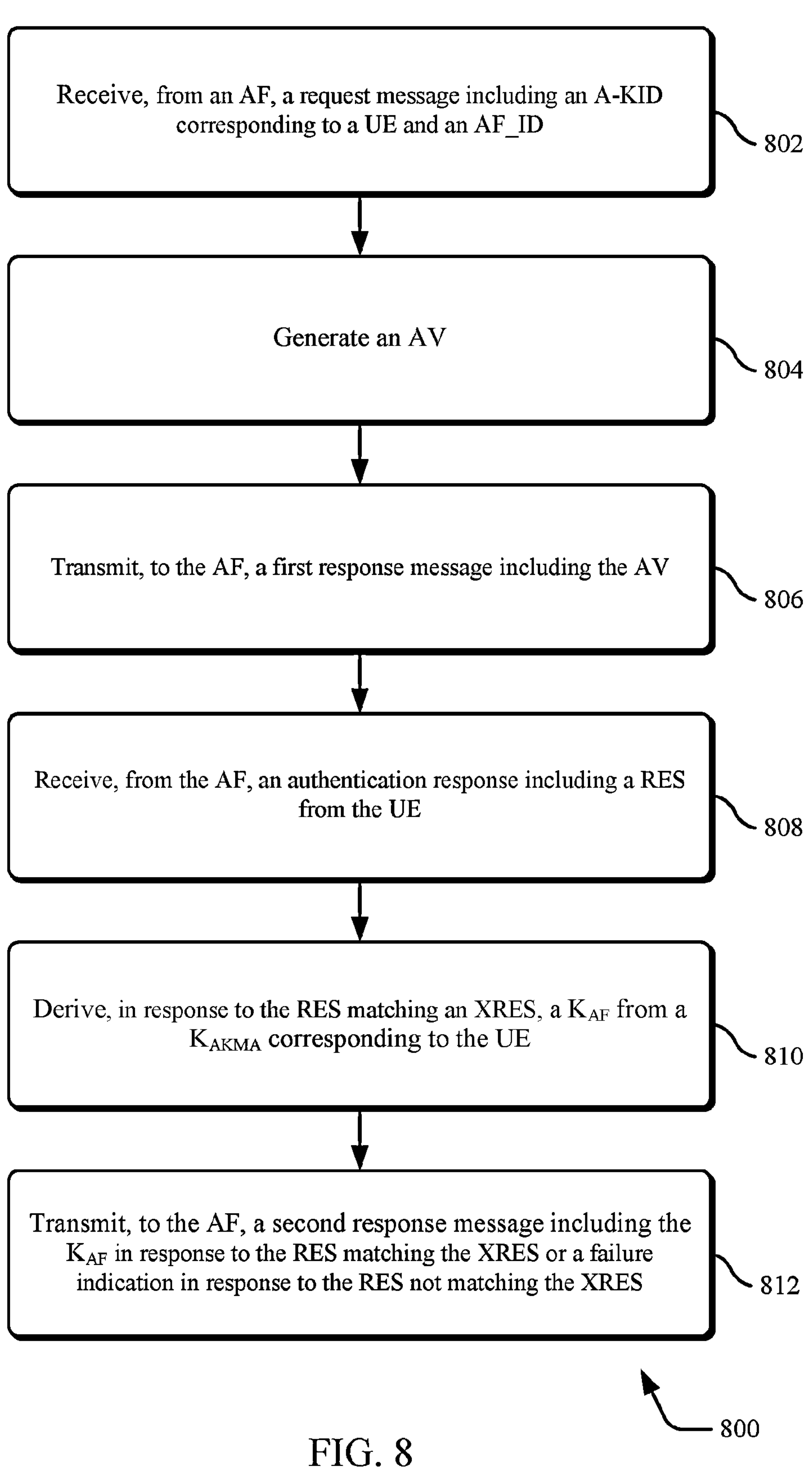
FIG. 8 illustrates a flowchart of a method that supports UE authentication for applications in accordance with aspects of the present disclosure.

FIG. 8 illustrates a flowchart of a method 800 that supports UE authentication for applications in accordance with aspects of the present disclosure. The operations of the method 800 may be implemented by a device or its components as described herein. For example, the operations of the method 800 may be performed by a device, such as a device implementing AAnF 214 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 802, the method may include receiving, from an AF, a request message including an A-KID corresponding to a UE and an AF_ID. The operations of 802 may be performed in accordance with examples as described herein. In some implementations, aspects of the operations of 802 may be performed by a device as described with reference to FIG. 1.

At 804, the method may include generating an AV. The operations of 804 may be performed in accordance with examples as described herein. In some implementations, aspects of the operations of 804 may be performed by a device as described with reference to FIG. 1.

At 806, the method may include transmitting, to the AF, a first response message including the AV. The operations of 806 may be performed in accordance with examples as described herein. In some implementations, aspects of the operations of 806 may be performed by a device as described with reference to FIG. 1.

At 808, the method may include receiving, from the AF, an authentication response including a RES from the UE. The operations of 808 may be performed in accordance with examples as described herein. In some implementations, aspects of the operations of 808 may be performed by a device as described with reference to FIG. 1.

At 810, the method may include deriving, in response to the RES matching an XRES, a $K_{AF}$ from a $K_{AKMA}$ corresponding to the UE. The operations of 810 may be performed in accordance with examples as described herein. In some implementations, aspects of the operations of 810 may be performed by a device as described with reference to FIG. 1.

At 812, the method may include transmitting, to the AF, a second response message including the $K_{AF}$ in response to the RES matching the XRES or a failure indication in response to the RES not matching the XRES. The operations of 812 may be performed in accordance with examples as described herein. In some implementations, aspects of the operations of 812 may be performed by a device as described with reference to FIG. 1.

Figure 9:
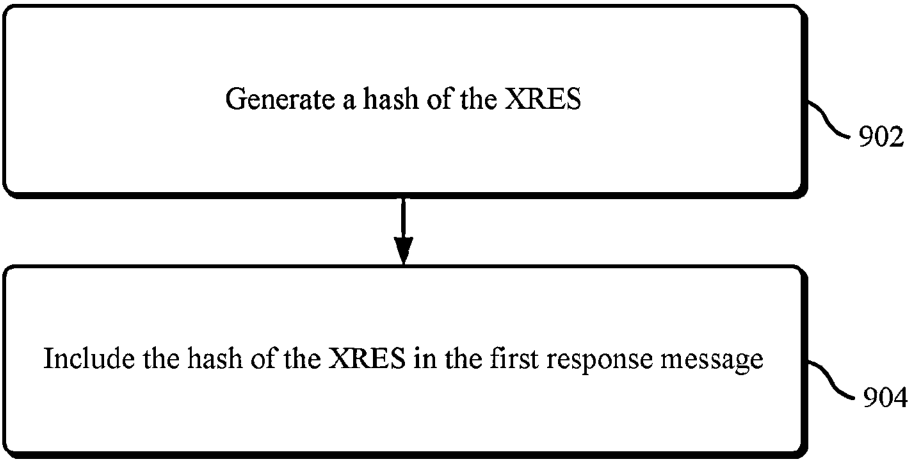
FIG. 9 illustrates a flowchart of a method that supports UE authentication for applications in accordance with aspects of the present disclosure.
Figure 9:
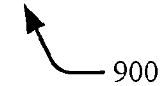

FIG. 9 illustrates a flowchart of a method 900 that supports UE authentication for applications in accordance with aspects of the present disclosure. The operations of the method 900 may be implemented by a device or its components as described herein. For example, the operations of the method 800 may be performed by a device, such as a device implementing AAnF 214 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 902, the method may include generating a hash of the XRES. The operations of 902 may be performed in accordance with examples as described herein. In some implementations, aspects of the operations of 902 may be performed by a device as described with reference to FIG. 1.

At 904, the method may include including the hash of the XRES in the first response message. The operations of 904 may be performed in accordance with examples as described herein. In some implementations, aspects of the operations of 904 may be performed by a device as described with reference to FIG. 1.

Figure 10:
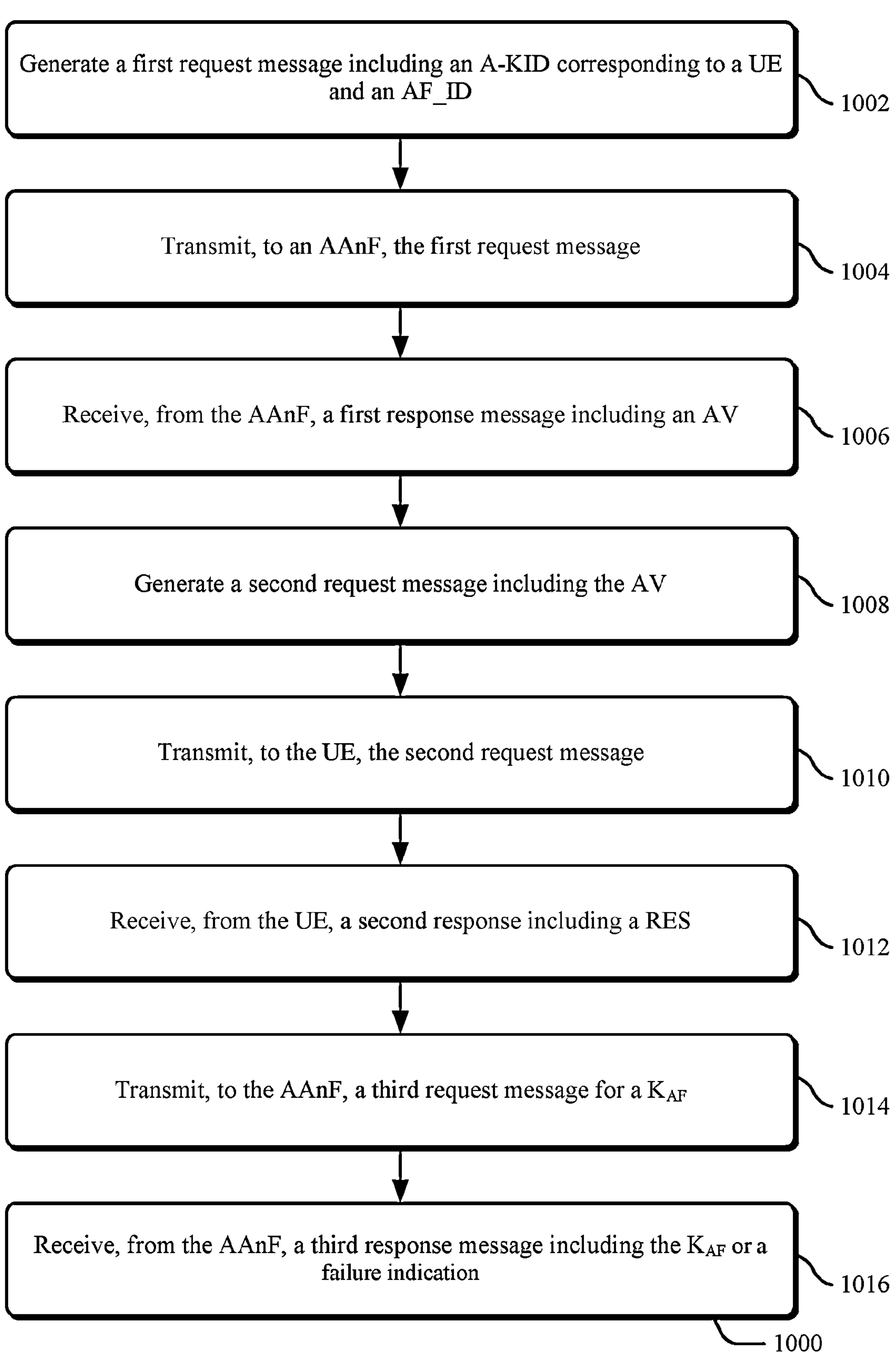
FIG. 10 illustrates a flowchart of a method that supports UE authentication for applications in accordance with aspects of the present disclosure.

FIG. 10 illustrates a flowchart of a method 1000 that supports UE authentication for applications in accordance with aspects of the present disclosure. The operations of the method 1000 may be implemented by a device or its components as described herein. For example, the operations of the method 1000 may be performed by a device, such as a device implementing AF 222 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1002, the method may include generating a first request message including an A-KID corresponding to a UE and an AF_ID. The operations of 1002 may be performed in accordance with examples as described herein. In some implementations, aspects of the operations of 1002 may be performed by a device as described with reference to FIG. 1.

At 1004, the method may include transmitting, to an AAnF, the first request message. The operations of 1004 may be performed in accordance with examples as described herein. In some implementations, aspects of the operations of 1004 may be performed by a device as described with reference to FIG. 1.

At 1006, the method may include receiving, from the AAnF, a first response message including an AV. The operations of 1006 may be performed in accordance with examples as described herein. In some implementations, aspects of the operations of 1006 may be performed by a device as described with reference to FIG. 1.

At 1008, the method may include generating a second request message including the AV. The operations of 1008 may be performed in accordance with examples as described herein. In some implementations, aspects of the operations of 1008 may be performed by a device as described with reference to FIG. 1.

At 1010, the method may include transmitting, to the UE, the second request message. The operations of 1010 may be performed in accordance with examples as described herein. In some implementations, aspects of the operations of 1010 may be performed by a device as described with reference to FIG. 1.

At 1012, the method may include receiving, from the UE, a second response message including a RES. The operations of 1012 may be performed in accordance with examples as described herein. In some implementations, aspects of the operations of 1012 may be performed by a device as described with reference to FIG. 1.

At 1014, the method may include transmitting, to the AAnF, a third request message for a $K_{AF}$. The operations of 1014 may be performed in accordance with examples as described herein. In some implementations, aspects of the operations of 1014 may be performed by a device as described with reference to FIG. 1.

At 1016, the method may include receiving, from the AAnF, a third response message including the $K_{AF}$ or a failure indication. The operations of 1016 may be performed in accordance with examples as described herein. In some implementations, aspects of the operations of 1016 may be performed by a device as described with reference to FIG. 1.

Figure 11:
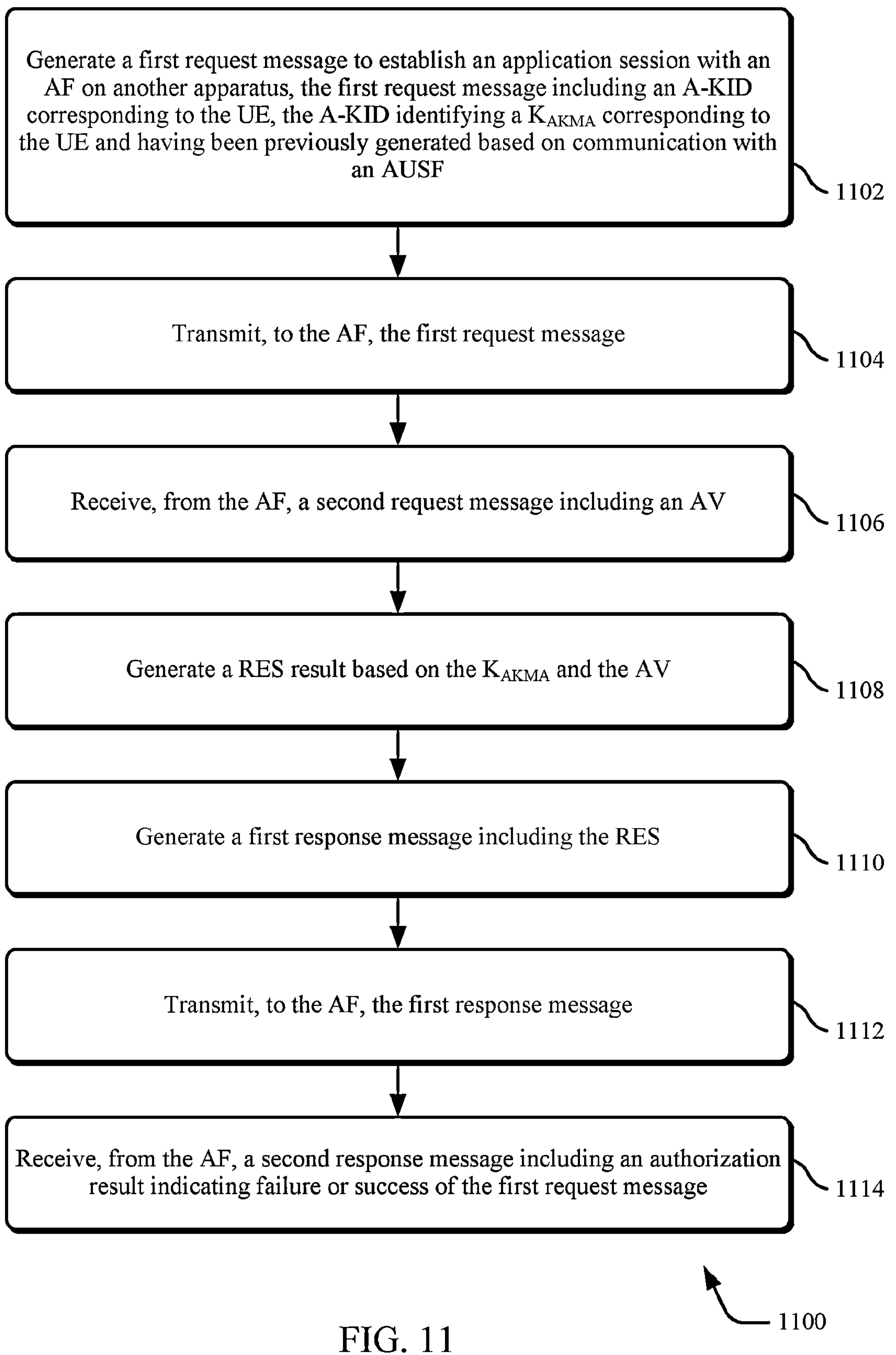
FIG. 11 illustrates a flowchart of a method that supports UE authentication for applications in accordance with aspects of the present disclosure.

FIG. 11 illustrates a flowchart of a method 1100 that supports UE authentication for applications in accordance with aspects of the present disclosure. The operations of the method 1100 may be implemented by a device or its components as described herein. For example, the operations of the method 1100 may be performed by a device, such as a UE 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1102, the method may include generating a first request message to establish an application session with an AF on another apparatus, the first request message including an A-KID corresponding to the UE, the A-KID identifying a $K_{AKMA}$ corresponding to the UE and having been previously generated based on communication with an AUSF. The operations of 1102 may be performed in accordance with examples as described herein. In some implementations, aspects of the operations of 1102 may be performed by a device as described with reference to FIG. 1.

At 1104, the method may include transmitting, to the AF, the first request message. The operations of 1104 may be performed in accordance with examples as described herein. In some implementations, aspects of the operations of 1104 may be performed by a device as described with reference to FIG. 1.

At 1106, the method may include receiving, from the AF a second request message including an AV. The operations of 1106 may be performed in accordance with examples as described herein. In some implementations, aspects of the operations of 1106 may be performed by a device as described with reference to FIG. 1.

At 1108, the method may include generating a RES based on the $K_{AKMA}$ and the AV. The operations of 1108 may be performed in accordance with examples as described herein. In some implementations, aspects of the operations of 1108 may be performed by a device as described with reference to FIG. 1.

At 1110, the method may include generating a first response message including the RES. The operations of 1110 may be performed in accordance with examples as described herein. In some implementations, aspects of the operations of 1110 may be performed by a device as described with reference to FIG. 1.

At 1112, the method may include transmitting, to the AF, the first response message. The operations of 1112 may be performed in accordance with examples as described herein. In some implementations, aspects of the operations of 1112 may be performed by a device as described with reference to FIG. 1.

At 1114, the method may include receiving, from the AF, a second response message including an authorization result indicating failure or success of the first request message. The operations of 1114 may be performed in accordance with examples as described herein. In some implementations, aspects of the operations of 1114 may be performed by a device as described with reference to FIG. 1.

Figure 12:
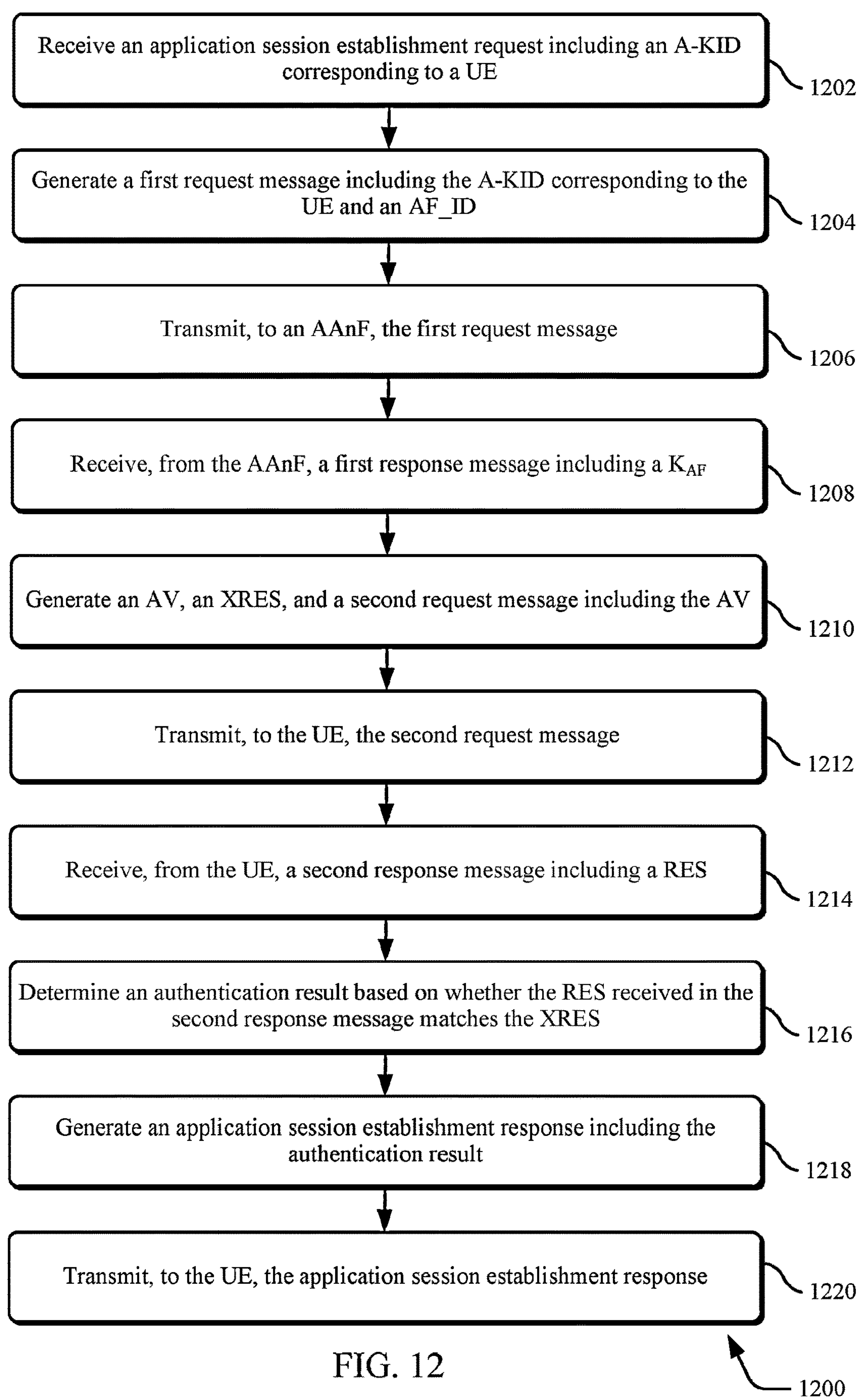
FIG. 12 illustrates a flowchart of a method that supports UE authentication for applications in accordance with aspects of the present disclosure.

FIG. 12 illustrates a flowchart of a method 1200 that supports UE authentication for applications in accordance with aspects of the present disclosure. The operations of the method 1200 may be implemented by a device or its components as described herein. For example, the operations of the method 1200 may be performed by a device, such as a device implementing AF 222 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1202, the method may include receiving an application session establishment request including an A-KID corresponding to a UE. The operations of 1202 may be performed in accordance with examples as described herein. In some implementations, aspects of the operations of 1202 may be performed by a device as described with reference to FIG. 1.

At 1204, the method may include generating a first request message including the A-KID corresponding to the UE and an AF_ID. The operations of 1204 may be performed in accordance with examples as described herein. In some implementations, aspects of the operations of 1204 may be performed by a device as described with reference to FIG. 1.

At 1206, the method may include transmitting, to an AAnF, the first request message. The operations of 1206 may be performed in accordance with examples as described herein. In some implementations, aspects of the operations of 1206 may be performed by a device as described with reference to FIG. 1.

At 1208, the method may include receiving, from the AAnF, a first response including a $K_{AF}$. The operations of 1208 may be performed in accordance with examples as described herein. In some implementations, aspects of the operations of 1208 may be performed by a device as described with reference to FIG. 1.

At 1210, the method may include generating an AV, an XRES, and a second request message including the AV. The operations of 1210 may be performed in accordance with examples as described herein. In some implementations, aspects of the operations of 1210 may be performed by a device as described with reference to FIG. 1.

At 1212, the method may include transmitting, to the UE, the second request message. The operations of 1212 may be performed in accordance with examples as described herein. In some implementations, aspects of the operations of 1212 may be performed by a device as described with reference to FIG. 1.

At 1214, the method may include receiving, from the UE, a second response message including a RES. The operations of 1214 may be performed in accordance with examples as described herein. In some implementations, aspects of the operations of 1214 may be performed by a device as described with reference to FIG. 1.

At 1216, the method may include determining an authentication result based on whether the RES received in the second response message matches the XRES. The operations of 1216 may be performed in accordance with examples as described herein. In some implementations, aspects of the operations of 1216 may be performed by a device as described with reference to FIG. 1.

At 1218, the method may include generating an application session establishment response including the authentication result. The operations of 1218 may be performed in accordance with examples as described herein. In some implementations, aspects of the operations of 1218 may be performed by a device as described with reference to FIG. 1.

At 1220, the method may include transmitting, to the UE, the application session establishment response. The operations of 1220 may be performed in accordance with examples as described herein. In some implementations, aspects of the operations of 1220 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus comprising:

at least one memory; and at least one processor coupled with the at least one memory and configured to cause the apparatus to:

receive, from an application function, a request message including a key identifier corresponding to a user equipment (UE) and an application function identifier;

generate an authentication vector;

transmit, to the application function, a first response message including the generated authentication vector;

receive, from the application function, an authentication response including a challenge result from the UE;

derive, in response to the challenge result matching an expected challenge result, an application key from an authentication and key management for applications anchor key corresponding to the UE; and transmit, to the application function, a second response message including the application key in response to the challenge result matching the expected challenge result or a failure indication in response to the challenge result not matching the expected challenge result.

2. The apparatus of claim 1, wherein the at least one processor is further configured to cause the apparatus to:

generate a hash of the expected challenge result; and include the hash of the expected challenge result in the first response message.

3. The apparatus of claim 1, wherein the at least one processor is further configured to cause the apparatus to generate the expected challenge result using the authentication and key management for applications anchor key corresponding to the UE, the authentication vector, and a key derivation function.

4. The apparatus of claim 1, wherein the at least one processor is further configured to cause the apparatus to:

generate an authentication result that indicates success or failure; and include the authentication result in the second response message.

5. The apparatus of claim 1, wherein the at least one processor is further configured to cause the apparatus to determine that authentication is required and to generate the authentication vector in response to determining that authentication is required.

6. The apparatus of claim 5, wherein the at least one processor is further configured to cause the apparatus to determine that authentication is required based on the key identifier corresponding to the UE, on the application function identifier or a combination thereof.

7. The apparatus of claim 1, wherein the authentication vector comprises a random number.

8. The apparatus of claim 1, wherein the second response message further includes an application key expiration time.

9. An apparatus comprising:

at least one memory; and at least one processor coupled with the at least one memory and configured to cause the apparatus to:

generate a first request message including a key identifier corresponding to a user equipment (UE) and an application function identifier;

transmit, to an authentication and key management for applications anchor function, the first request message;

receive, from the authentication and key management for applications anchor function, a first response message including an authentication vector;

generate a second request message including the application vector;

transmit, to the UE, the second request message;

receive, from the UE, a second response message including a challenge result;

transmit, to the authentication and key management for applications anchor function, a third request message for an application key; and receive, from the authentication and key management for applications anchor function, a third response message including the application key or a failure indication.

10. The apparatus of claim 9, wherein the at least one processor is further configured to cause the apparatus to:

receive an application session establishment request including the key identifier corresponding to the UE, wherein the third response message further includes an authentication result that indicates success or failure;

transmit, to the UE, an application session establishment response including the authentication result.

11. The apparatus of claim 9, wherein the third request message includes the challenge result and the third response message includes the application key only if the authentication and key management for applications anchor function determines that the challenge result matches an expected challenge result.

12. The apparatus of claim 9, wherein the second request message further includes a hash of an expected challenge result, and the at least one processor is further configured to cause the apparatus to:

generate a hash of the challenge result received in the second response message;

determine whether the hash of the expected challenge result matches the hash of the challenge result; and include in the third request message an indication of failure of the challenge result if the hash of the expected challenge result does not match the hash of the challenge result.

13. The apparatus of claim 9, wherein the first response message further includes an expected challenge result, and the at least one processor is further configured to cause the apparatus to:

determine whether the challenge result received in the second response message matches the expected challenge result; and include an authentication result in the third request message indicating whether the challenge result matches the expected challenge result.

14. The apparatus of claim 13, wherein the third response message includes the application key and an application key expiration time in response to the authentication result indicating that the challenge result received in the second response message matches the expected challenge result.

15. A user equipment (UE) for wireless communication, comprising:

at least one memory; and at least one processor coupled with the at least one memory and configured to cause the UE to:

generate a first request message to establish an application session with an application function on an apparatus, the first request message including a key identifier corresponding to the UE, the key identifier identifying an authentication and key management for applications anchor key corresponding to the UE and having been previously generated based on communication with an authentication server function;

transmit, to the application function, the first request message;

receive, from the application function, a second request message including an authentication vector;

generate a challenge result based on the authentication and key management for applications anchor key and the authentication vector and generate a first response message including the challenge result;

transmit, to the application function, the first response message; and receive, from the application function message, a second response including an authorization result indicating failure or success of the first request message.

16. The UE of claim 15, wherein the authentication vector comprises a random number.

17. The UE of claim 15, wherein to generate the challenge result is to generate the challenge result using the authentication and key management for applications anchor key corresponding to the UE, the authentication vector, and a key derivation function.

18. A processor for wireless communication, comprising:

at least one controller coupled with at least one memory and configured to cause the processor to:

generate a first request message to establish an application session with an application function on an apparatus, the first request message including a key identifier corresponding to a user equipment (UE), the key identifier identifying an authentication and key management for applications anchor key corresponding to the UE and having been previously generated based on communication with an authentication server function;

transmit, to the application function, the first request message;

receive, from the application function, a second request message including an authentication vector;

generate a challenge result based on the authentication and key management for applications anchor key and the authentication vector and generate a first response message including the challenge result;

transmit, to the application function, the first response message; and receive, from the application function message, a second response including an authorization result indicating failure or success of the first request message.

19. The processor of claim 18, wherein the authentication vector comprises a random number.

20. The processor of claim 18, wherein to generate the challenge result is to generate the challenge result using the authentication and key management for applications anchor key corresponding to the UE, the authentication vector, and a key derivation function.

* * * * *